(12) United States Patent
Shinohara

(10) Patent No.: US 9,146,387 B2
(45) Date of Patent: Sep. 29, 2015

(54) ZOOM LENS AND IMAGE PICKUP DEVICE INCLUDING THE SAME

(71) Applicant: CANON KABUSHIKI KAISHA, Tokyo (JP)

(72) Inventor: Kenji Shinohara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 47 days.

(21) Appl. No.: 14/198,684

(22) Filed: Mar. 6, 2014

(65) Prior Publication Data

US 2014/0268366 A1 Sep. 18, 2014

(30) Foreign Application Priority Data

Mar. 13, 2013 (JP) ................. 2013-050184

(51) Int. Cl.
*G02B 15/14* (2006.01)
*G02B 15/173* (2006.01)

(52) U.S. Cl.
CPC .................... *G02B 15/173* (2013.01)

(58) Field of Classification Search
CPC ...... G02B 13/009; G02B 15/14; G02B 15/16; G02B 15/20; G02B 15/24; G02B 15/28; G02B 15/167; G02B 15/173
USPC ................................. 359/676, 687
See application file for complete search history.

(56) References Cited

U.S. PATENT DOCUMENTS

| 7,477,457 | B2 | 1/2009 | Satori | |
| 7,995,286 | B2* | 8/2011 | Kimura | .......... 359/687 |
| 8,284,498 | B2 | 10/2012 | Shinohara et al. | |
| 2009/0040604 | A1* | 2/2009 | Obu et al. | ...... 359/432 |
| 2009/0040625 | A1* | 2/2009 | Shinohara et al. | ............. 359/687 |
| 2009/0296232 | A1* | 12/2009 | Okada | ........... 359/689 |

FOREIGN PATENT DOCUMENTS

JP H08-082743 A 3/1996

* cited by examiner

*Primary Examiner* — Ricky Mack
*Assistant Examiner* — Gary O'Neill
(74) *Attorney, Agent, or Firm* — Carter, DeLuca, Farrell & Schmidt, LLP

(57) ABSTRACT

A zoom lens includes, in order from an object side to an image side, a first lens unit having a positive refractive power, a second lens unit having a negative refractive power, a third lens unit having a positive refractive power, and a fourth lens unit having a positive refractive power, and is configured to move the second lens unit, the third lens unit, and the fourth lens unit during a zooming operation to change an interval between adjacent lens units. A moving amount of the second lens unit during a zooming operation from a wide angle end to a telephoto end, a focal length of the second lens unit, and transverse magnification of the third lens unit at the wide angle end and the telephoto end are individually set appropriately.

9 Claims, 15 Drawing Sheets

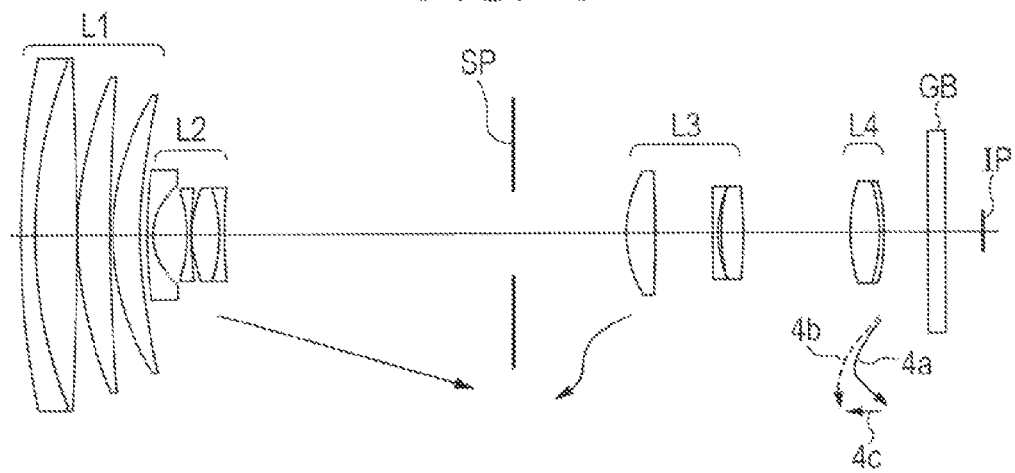
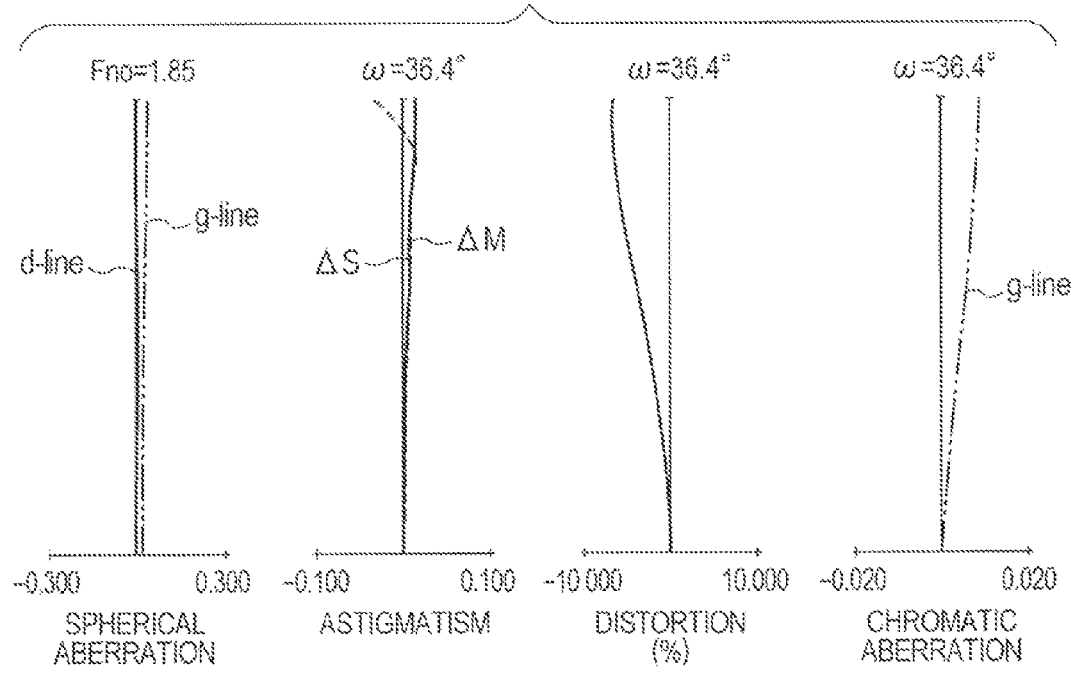

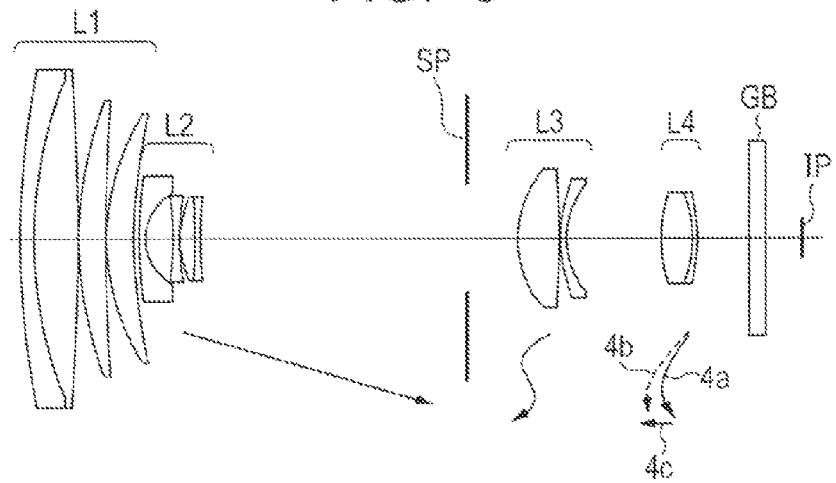
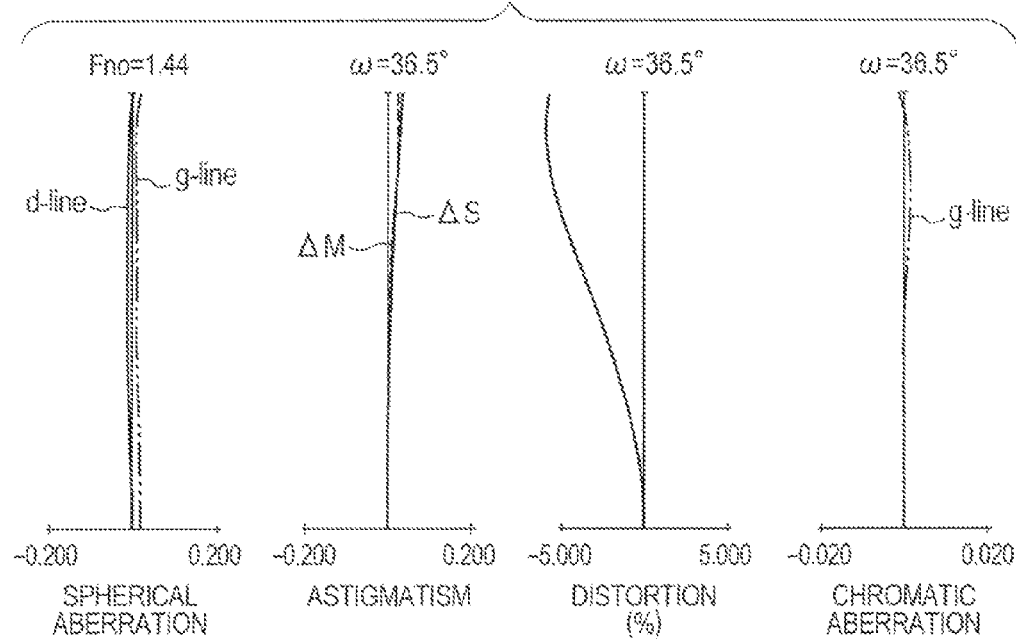

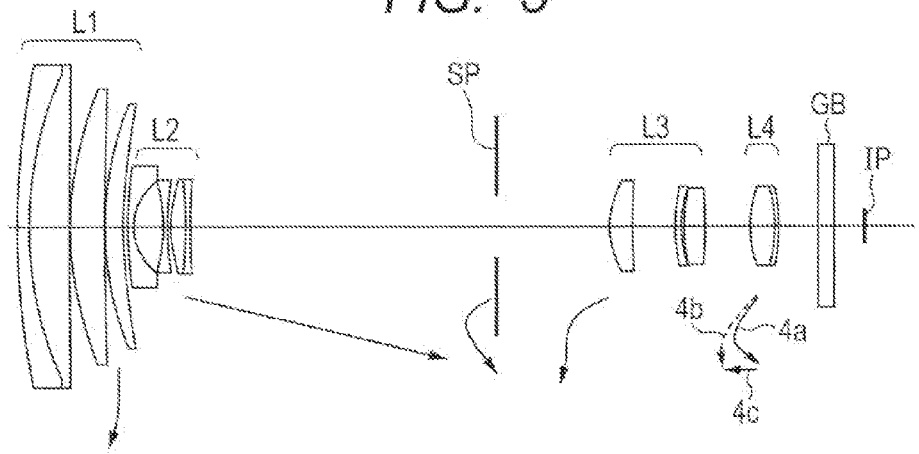
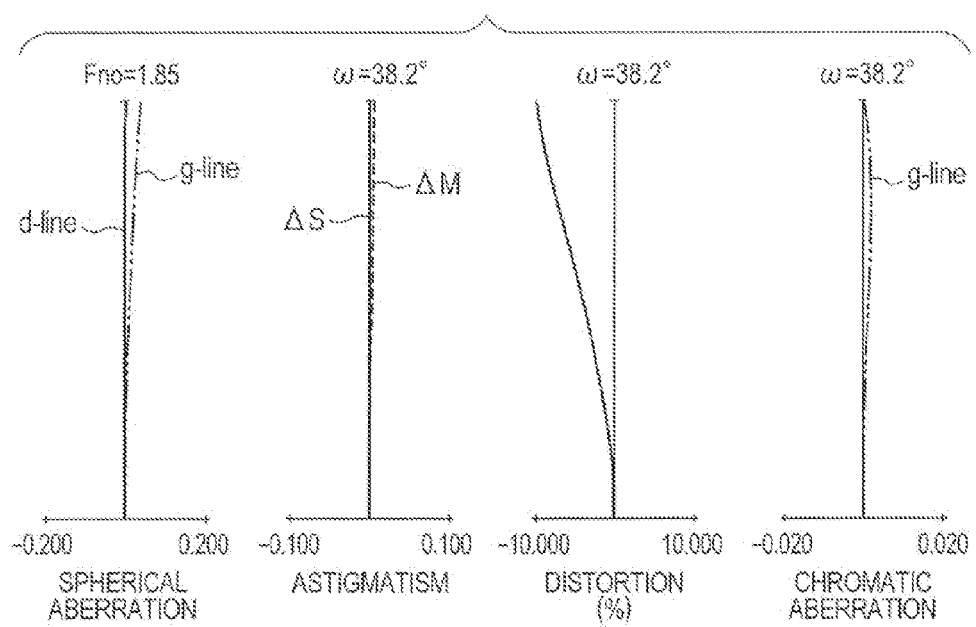

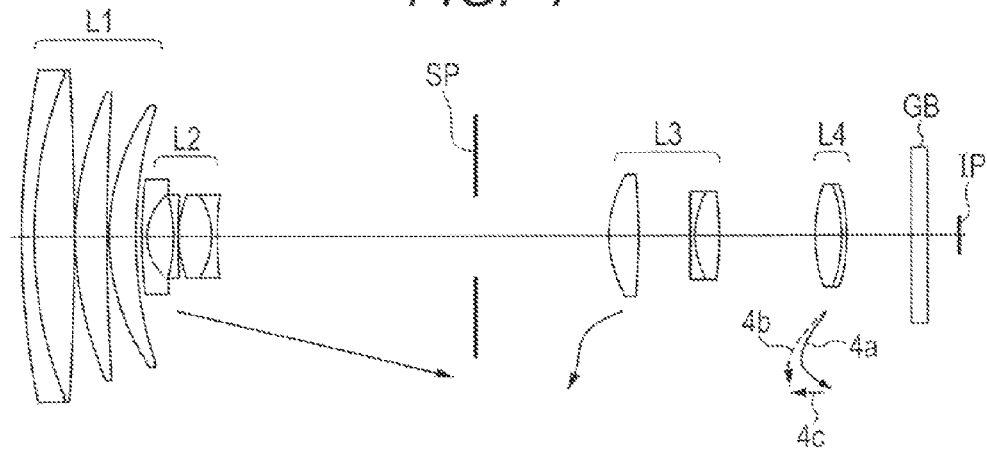
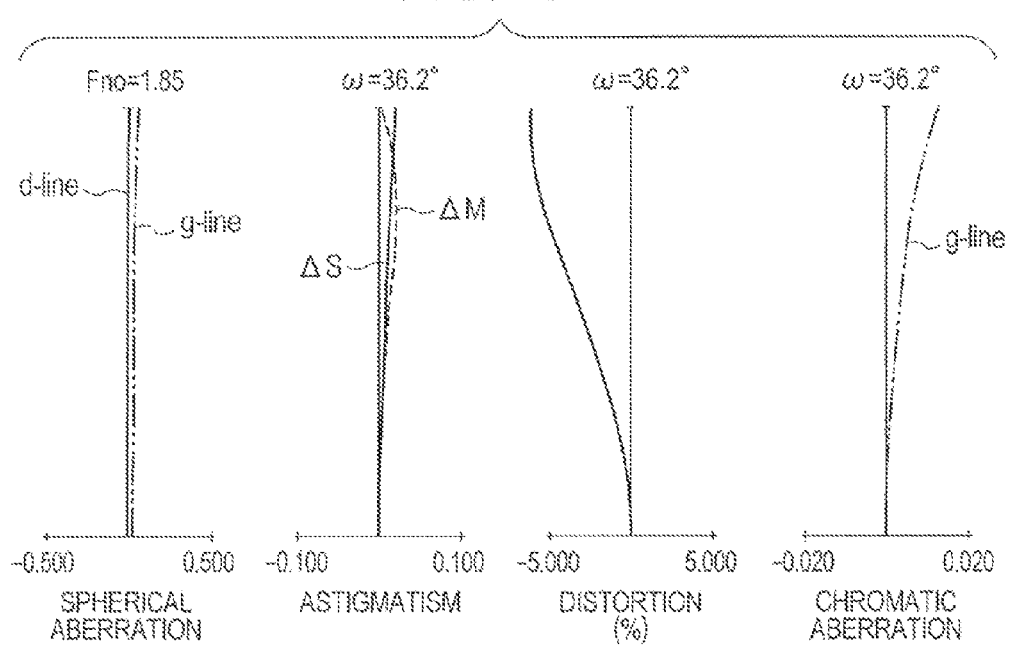

ZOOM LENS AND IMAGE PICKUP DEVICE INCLUDING THE SAME

BACKGROUND OF THE INVENTION

1. Field of the Invention

The present invention relates to a zoom lens, and more particularly, to a zoom lens suitable for a photographic optical system used in an image pickup device such as a video camera, a surveillance camera, a digital still camera, a broadcasting camera, and a silver-halide photographic camera.

2. Description of the Related Art

A photographic optical system used in the image pickup device is required to be a compact zoom lens having a wide angle of view, small aberrations a high zoom ratio, etc. An exemplary zoom lens that includes in order from an object side to an image side, a first lens unit having a positive refractive power, a second lens unit having a negative refractive power, a third lens unit having a positive refractive power, and a fourth lens unit having a positive refractive power has been known.

Japanese Patent Application. Laid-Open No, H08-82743 and U.S. Pat. No. 8,284,498 disclose a rear-focus-type four-unit zoom lens configured to change magnification by moving second and third lens units and correct image plane variations associated with the variable magnification by moving a fourth lens unit, while carrying out a focusing operation. U.S. Pat. No. 7,477,457 discloses a zoom lens configured to carry out a zooming operation by moving the four lens units, and a focusing operation is carried out by the fourth lens unit.

In the above-described positive-lead-type four-unit zoom lens, it is relatively easy to reduce the size of the entire zoom lens and obtain a high zoom ratio. To achieve a high optical performance over the entire zooming range while attempting to obtain a wide angle of view and a high zoom ratio, it becomes important to individually set the zoom type, refractive power configurations, etc., of the units appropriately. For example, in the rear-focus-type four-unit zoom lens of the above-described zoom type, it would be important to appropriately set the refractive power, a moving interval (moving amount) associated with zooming operation, an image forming magnification both at a wide angle end and a telephoto end, etc., of the second lens unit used for variable magnification.

Further, it becomes important to appropriately set the refractive power, image forming magnification at a wide angle end and a telephoto end, etc., of the third lens unit. Without setting these configurations appropriately, it would be difficult to achieve a high optical performance over the entire variable magnification range and to obtain a wide angle of view and high zoom ratio while reducing the size of the entire zoom lens.

SUMMARY OF THE INVENTION

According to an aspect of the present invention a zoom lens includes, in order from an object side to an image side, a first lens unit having a positive refractive power, a second lens unit having a negative refractive power, a third lens unit having a positive refractive power, and a fourth lens unit having a positive refractive power. The zoom lens is configured to move the second lens unit, the third lens unit, and the fourth lens unit during a zooming operation to change an interval between adjacent lens units. In the zoom lens, the following conditional expressions are satisfied:

$$4.6 < |M2/f2| < 7.5$$

$$0.4 < \beta 3t/\beta 3w < 4.5$$

where M2 represents a moving amount of the second lens unit during a zooming operation from a wide angle and to a telephoto end, f2 represents a focal length of the second lens unit, and $\beta 3t$ and $\beta 3w$ represent transverse magnification of the third lens unit at the wide angle end and the telephoto end, respectively.

Further features of the present invention will become apparent from the following description of exemplary embodiments with reference to the attached drawings.

BRIEF DESCRIPTION OF THE DRAWINGS

FIG. 1 is a cross-sectional view of a zoom lens according to a first embodiment at a wide angle end.

FIGS. 2A, 2B and 2C are aberration diagrams of the zoom lens of the first embodiment at the wide an end, a middle zooming position, and a telephoto end, respectively.

FIG. 3 is a cross-sectional view of a zoom lens according to a second embodiment at a wide angle end.

FIGS. 4A, 4B, and 4C are aberration diagrams of the zoom lens of the second embodiment at the wide angle end, a middle zooming position, and a telephoto end, respectively.

FIG. 5 is a cross-sectional view of a zoom lens according to a third embodiment at a wide angle end.

FIGS. 6A, 6B and 6C are aberration diagrams of the zoom lens of the third embodiment at the wide angle end, a middle zooming position, and a telephoto end, respectively.

FIG. 7 is a cross-sectional view of a zoom lens according to a fourth embodiment at a wide angle end.

FIGS. 8A, 8B, and 8C are aberration diagrams of the zoom lens of the fourth embodiment at the wide angle end, a middle zooming position, and a telephoto end, respectively.

DESCRIPTION OF THE EMBODIMENTS

Embodiments of a zoom lens and an image pickup device including the zoom lens of the present invention will be described below with reference to the accompanying drawings. A zoom lens according to an embodiment of the present invention includes, in order from an object side to an image side, a first lens unit having a positive refractive power, a second lens unit having a negative refractive power, a third lens unit having a positive refractive power, and a fourth lens unit having a positive refractive power. The second to fourth lens units move during a zooming operation to change an interval between adjacent lens units.

Figure 2B:
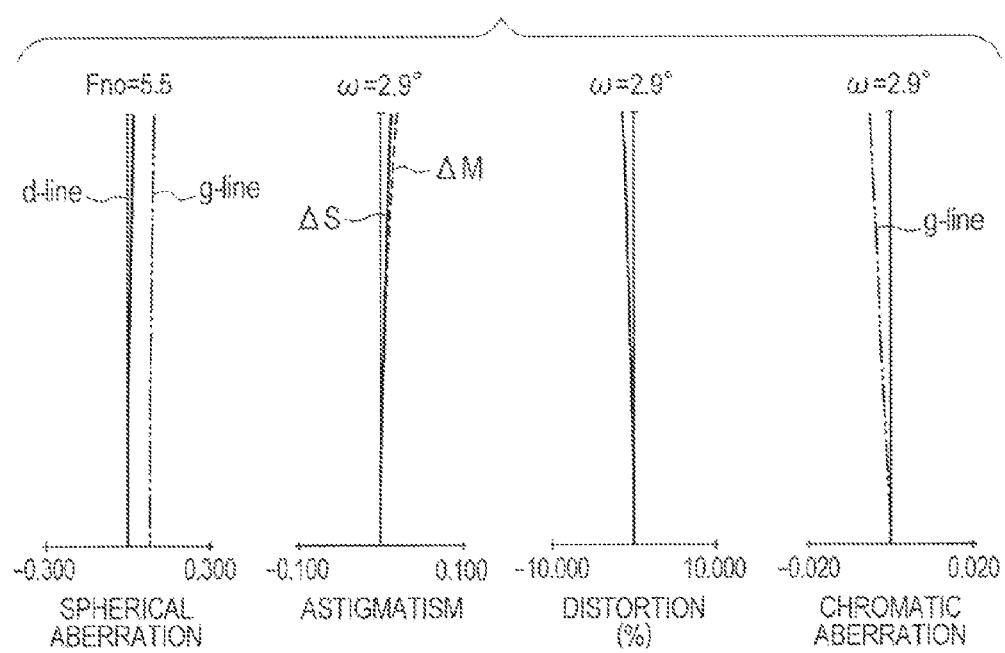
Figure 2C:
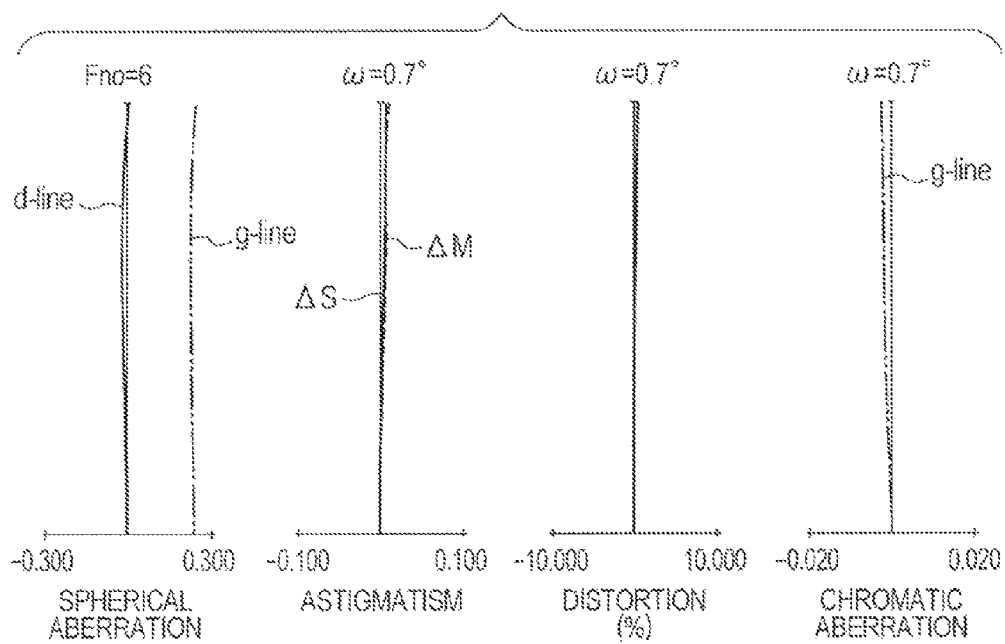
Figure 4B:
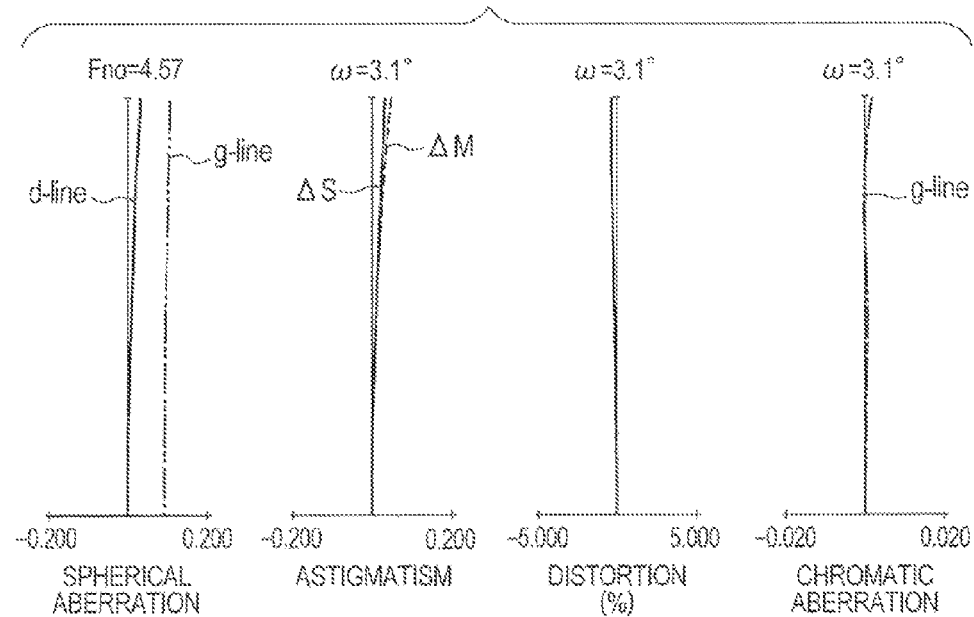
Figure 4C:
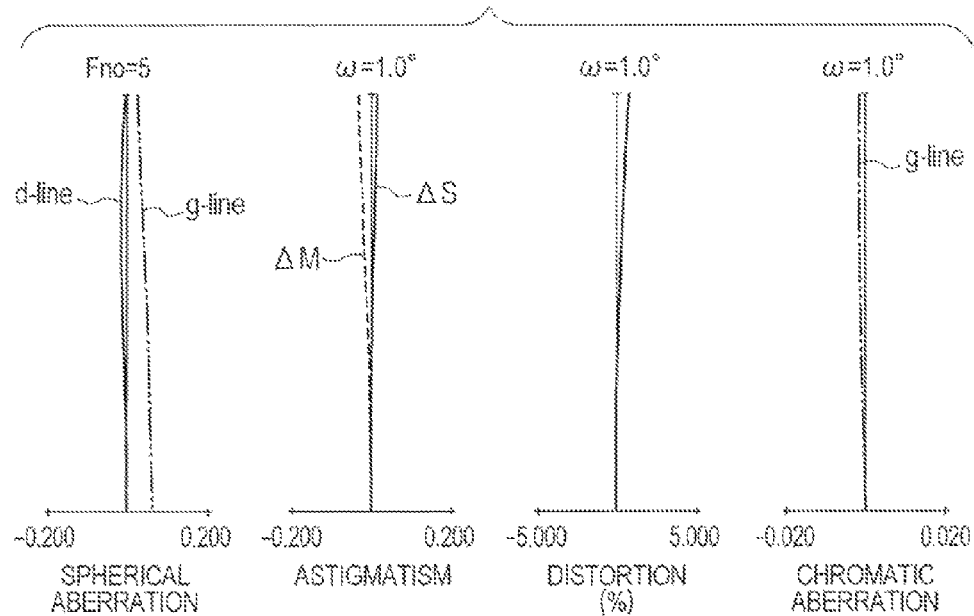

FIG. 1 is a cross-sectional view of a zoom lens according to a first embodiment of the present invention at wide angle end (short focal length end), FIGS. 2A, 2B, and 2C are aberration of the zoom lens of the first embodiment at the wide angle end, a middle zooming position, and a telephoto end (long focal length end), respectively, FIG. 3 is a cross-sectional view of a zoom lens according to a second embodiment of the present invention at a wide angle end. FIGS. 4A, 4B, and 4C are aberration diagrams of the zoom lens of the second embodiment at the wide angle end, a middle zooming position, and a telephoto end, respectively.

Figure 6B:
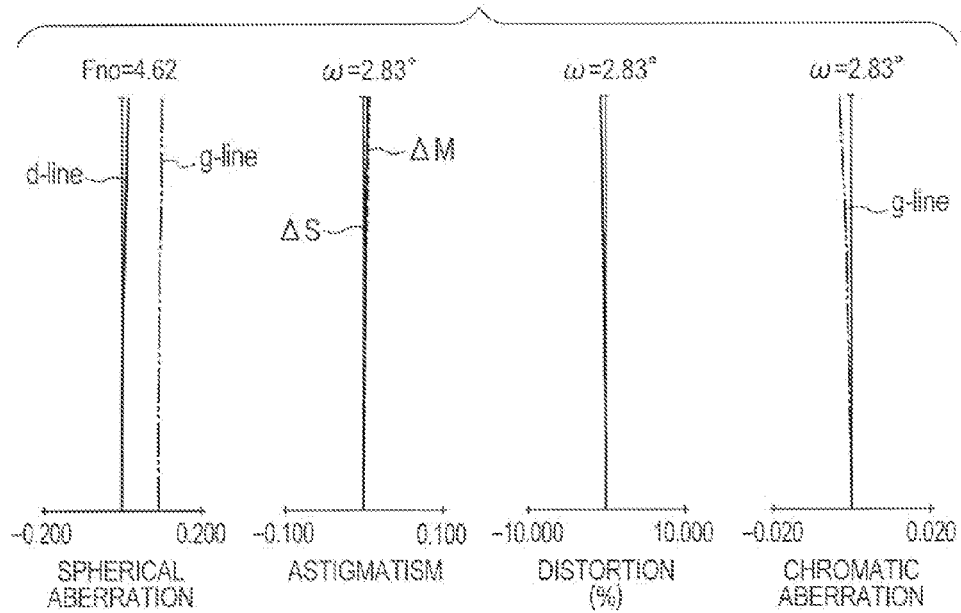
Figure 6C:
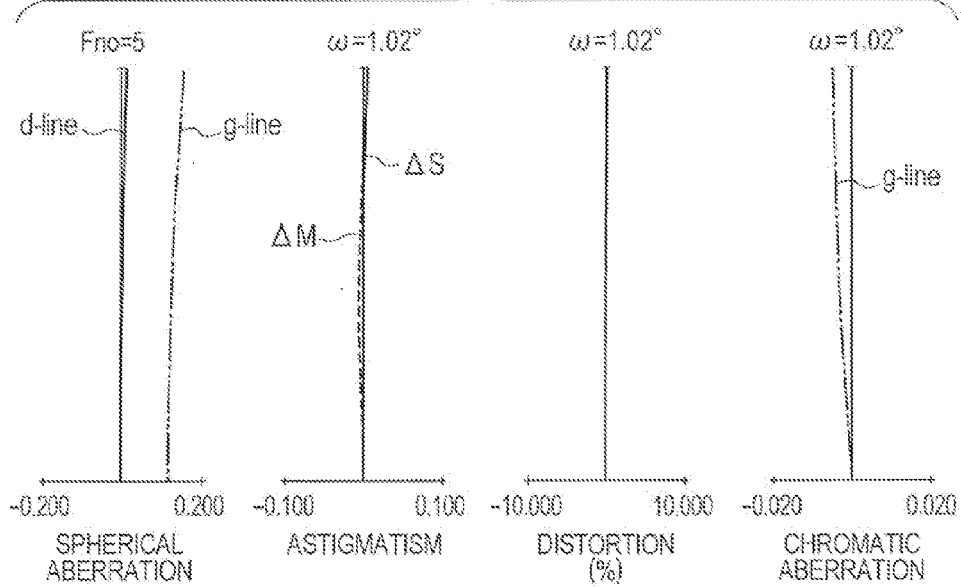
Figure 8B:
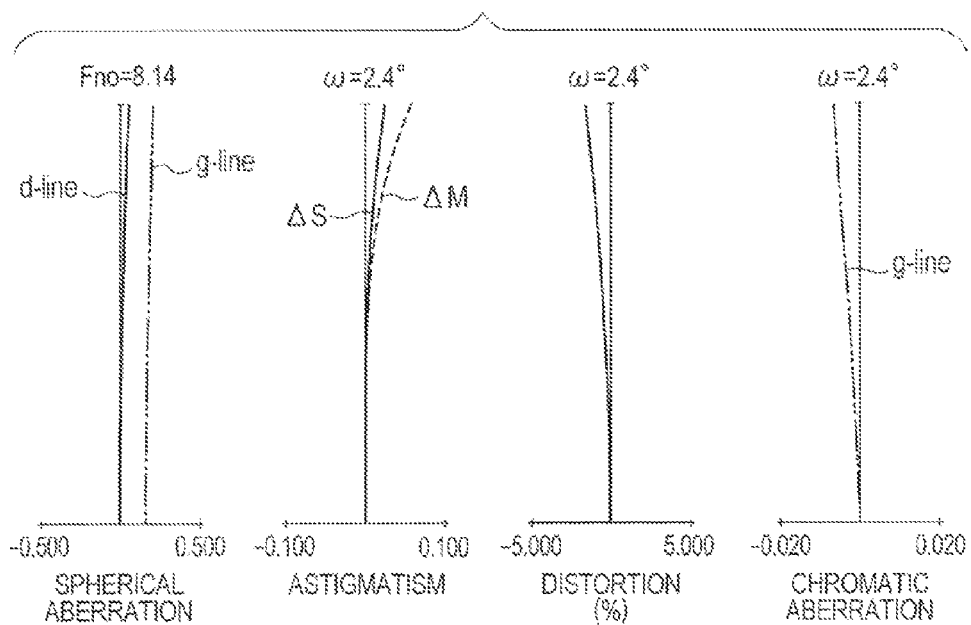
Figure 8C:
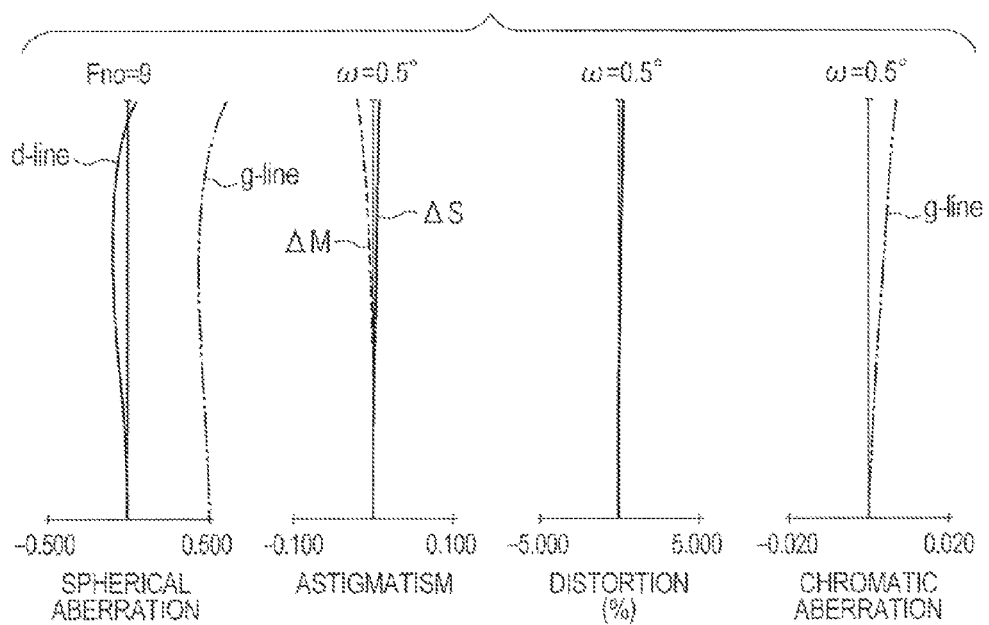

FIG. 5 is a cross-sectional view of a zoom lens according to a third embodiment of the present invention at a wide angle end. FIGS. 6A, 6B, and 6C are aberration diagrams of the zoom lens of the third embodiment at the wide angle end, a middle zooming position, and a telephoto respectively. FIG. 7 is a cross-sectional view of a zoom lens according to a fourth embodiment of the present invention at a wide angle end. FIGS. 8A, 8B, and 8C are aberration diagrams of the zoom lens of the fourth embodiment at the wide angle end, a middle zooming position, and a telephoto end, respectively.

Figure 9:
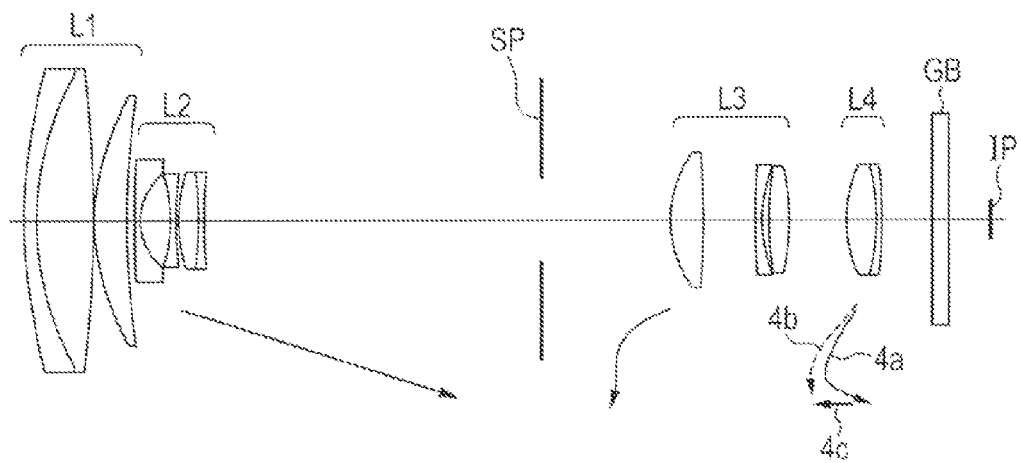
FIG. 9 is a cross-sectional view of a zoom lens according to a fifth embodiment at a wide angle end.
Figure 10A:
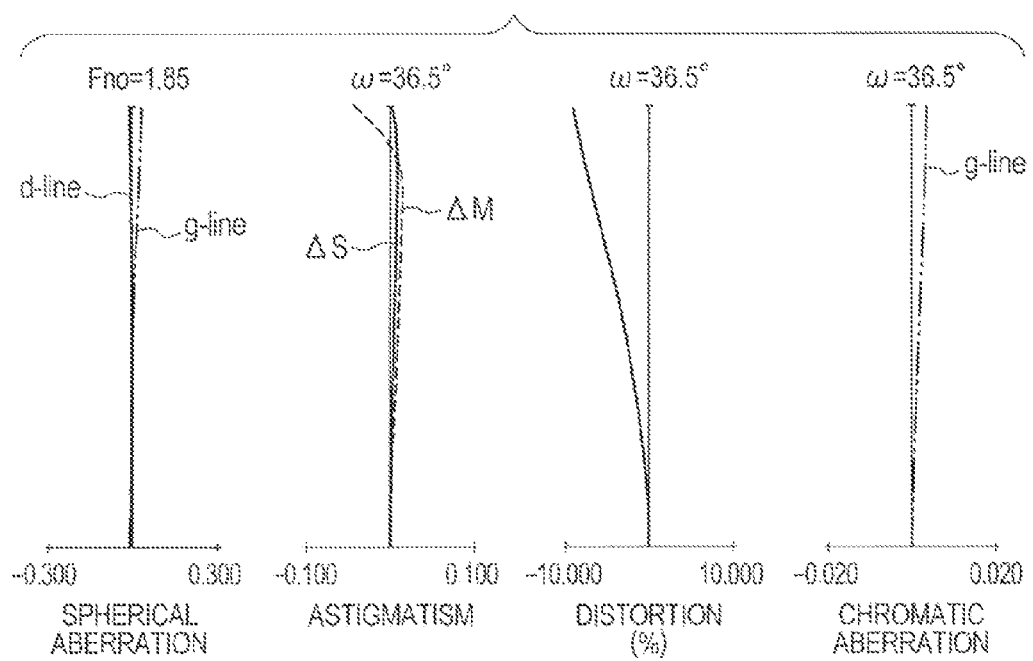
FIGS. 10A, 10B, and 10C are aberration diagrams of the zoom lens of the fifth embodiment at the wide angle end, a middle zooming position, and a telephoto end, respectively.
Figure 10B:
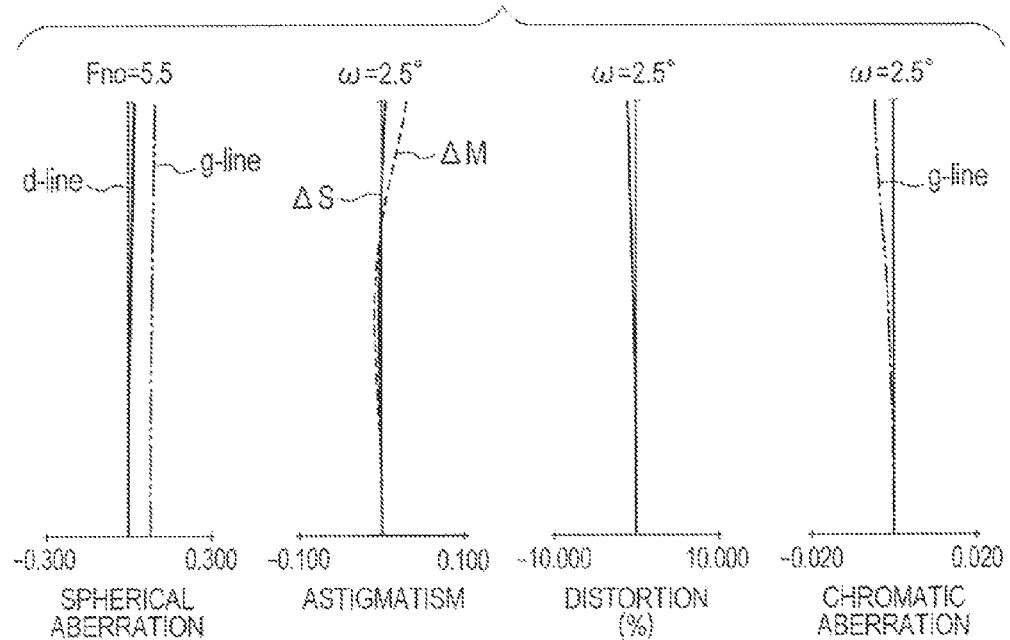
Figure 10C:
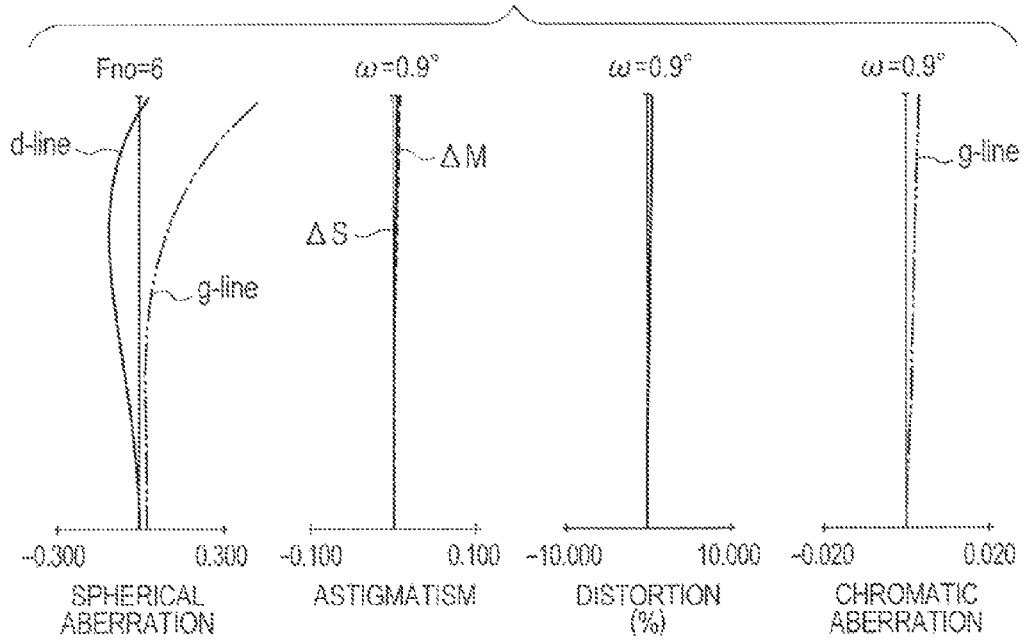
Figure 11:
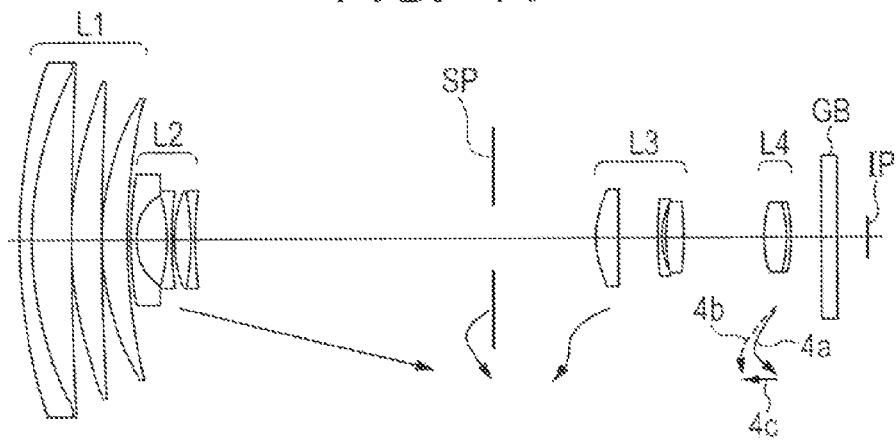
FIG. 11 is a cross-sectional view of a zoom lens according to a sixth embodiment at a wide angle end.
Figure 12A:
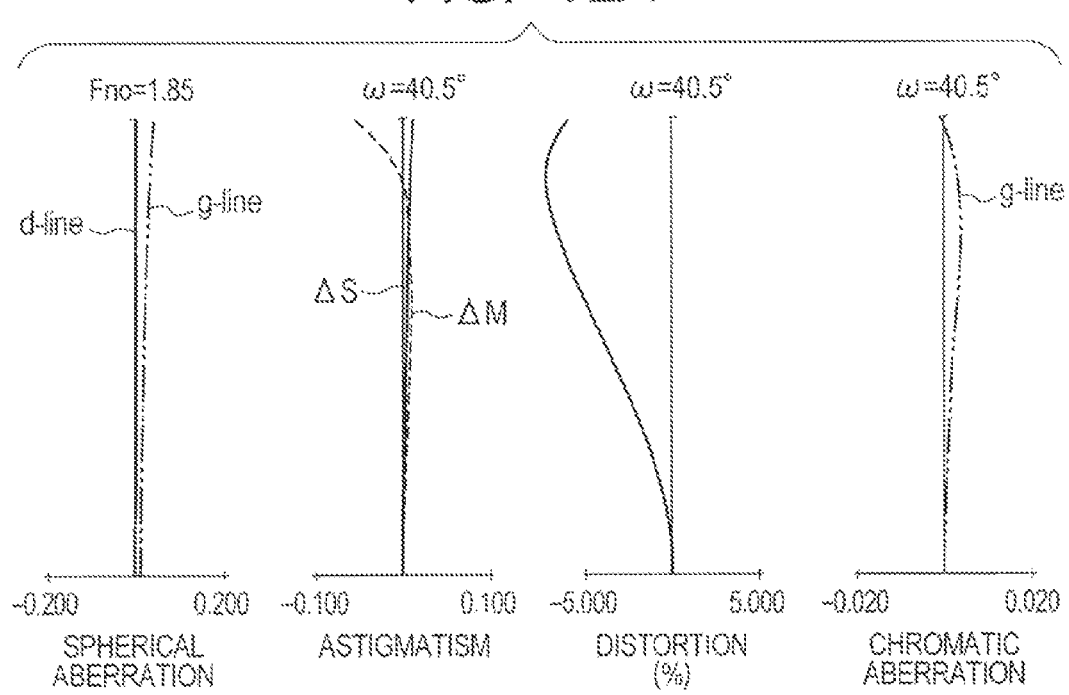
FIGS. 12A, 12B, and 12C are aberration diagrams of the zoom lens of the sixth embodiment at the wide angle end, a middle zooming position, and telephoto end, respectively.
Figure 12B:
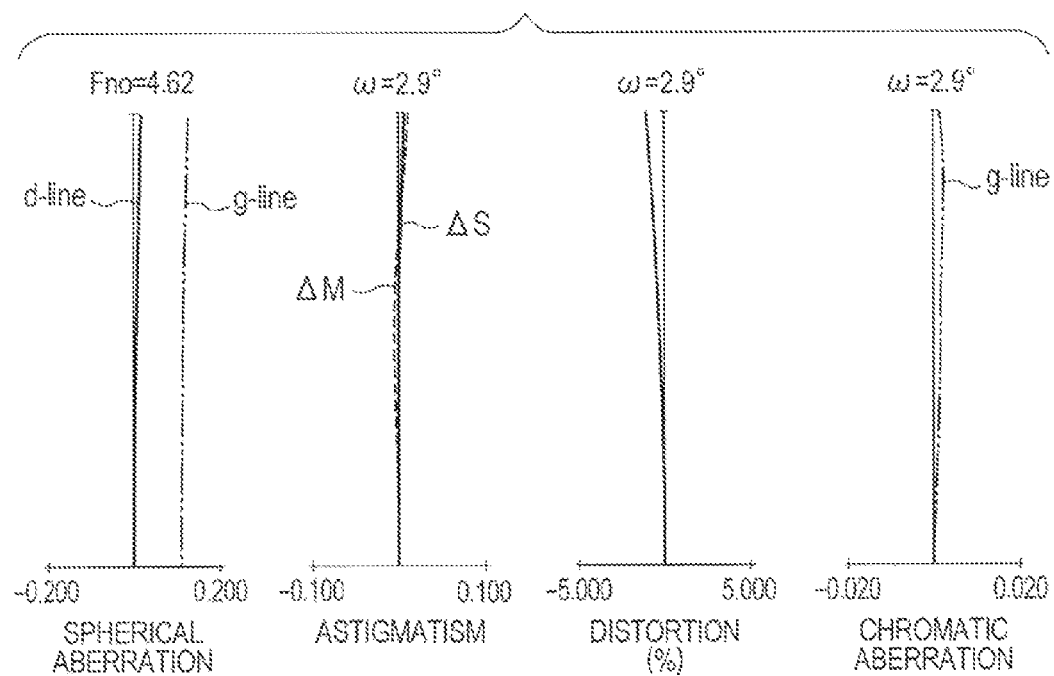
Figure 12C:
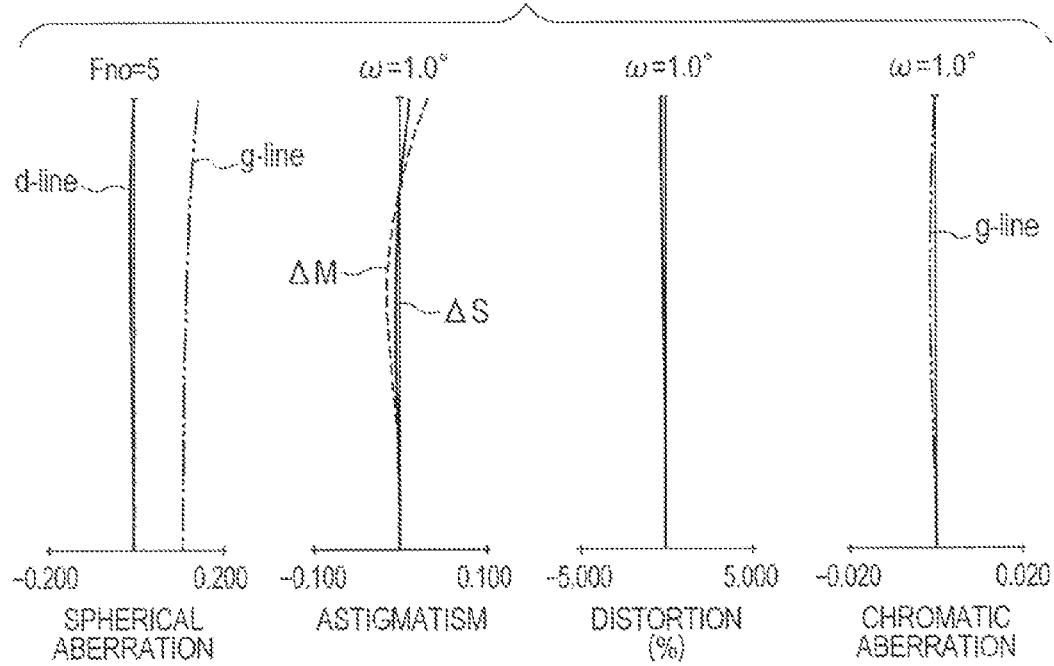

FIG. 9 is a cross-sectional view of a zoom lens according to a fifth embodiment of the present invention at a wide angle end. FIGS. 10A, 10B, and 10C are aberration diagrams of the zoom lens of the fifth embodiment at the wide angle end, a middle zooming position, and a telephoto end, respectively. FIG. 11 is a cross-sectional view of a zoom lens according to a sixth embodiment of the present invention at a wide angle end. FIGS. 12A, 12B, and 12C are aberration diagrams of the zoom lens of the sixth embodiment at the wide angle end, a middle zooming position, and a telephoto end, respectively.

Figure 13:
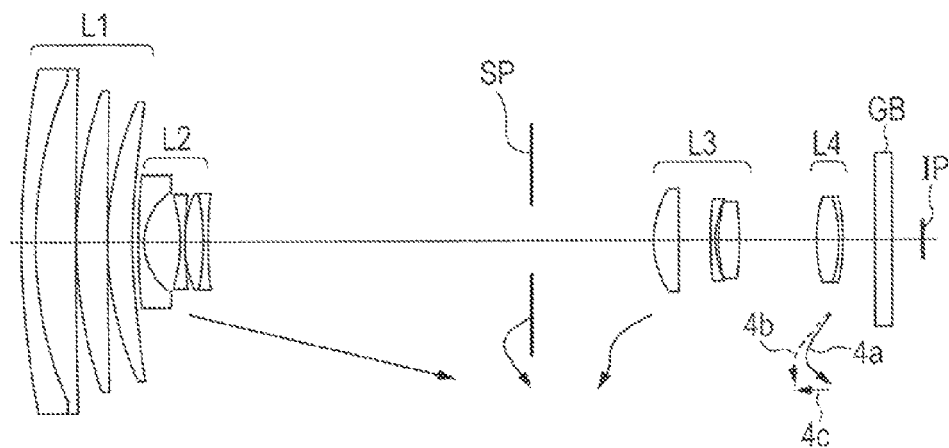
FIG. 13 is a cross-sectional view of a zoom lens according to a seventh embodiment at a wide angle end.
Figure 14A:
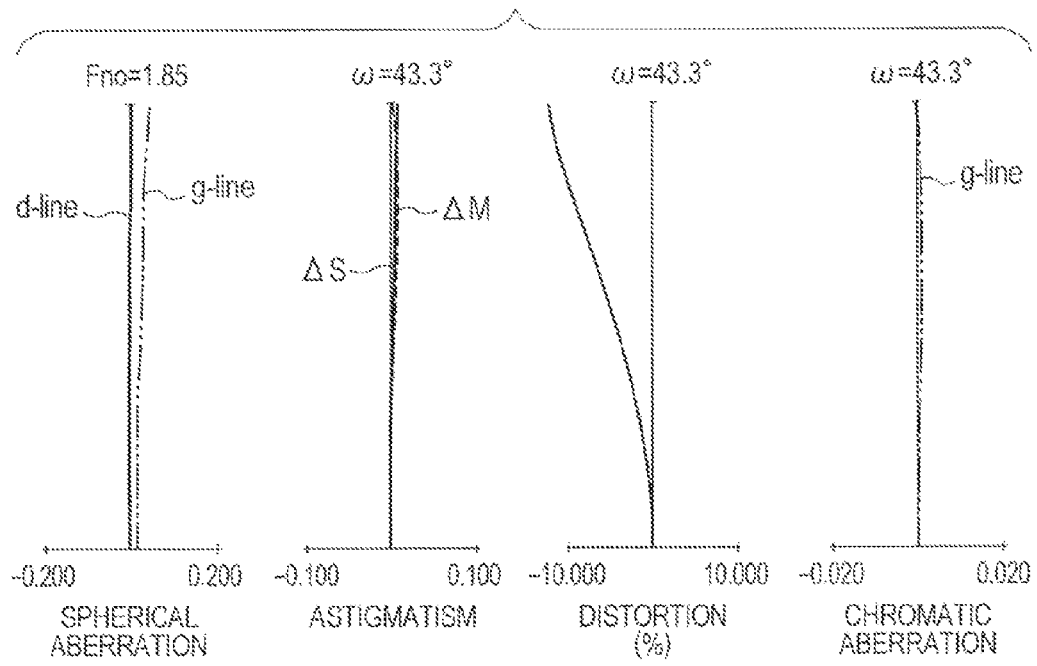
FIGS. 14A, 14B, and 14C are aberration diagrams of the zoom lens of the seventh embodiment at the wide angle end, a middle zooming position, and a telephoto end, respectively.
Figure 14B:
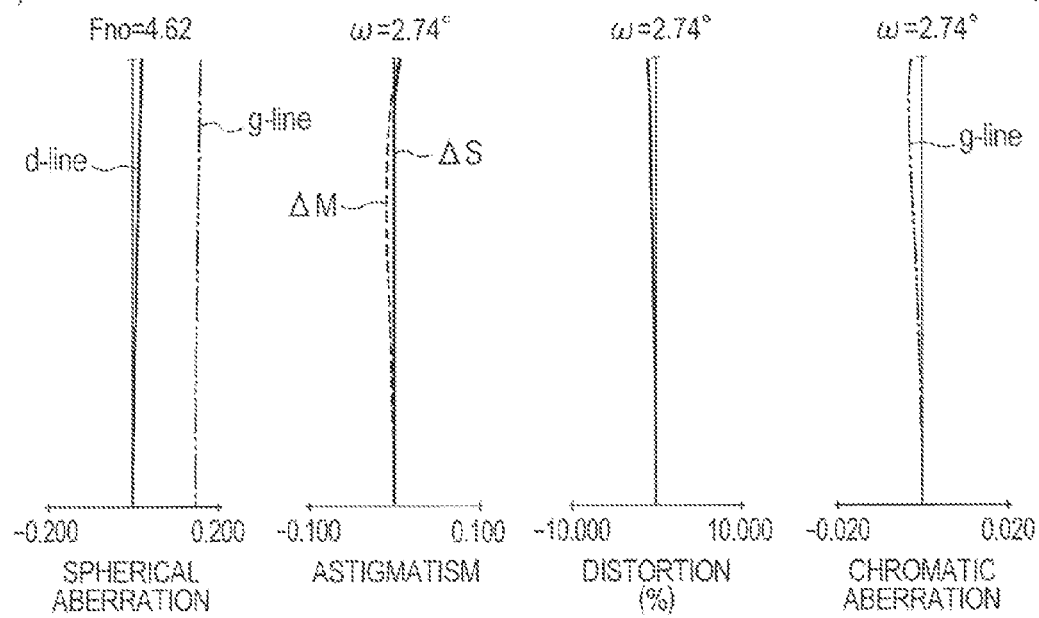
Figure 14C:
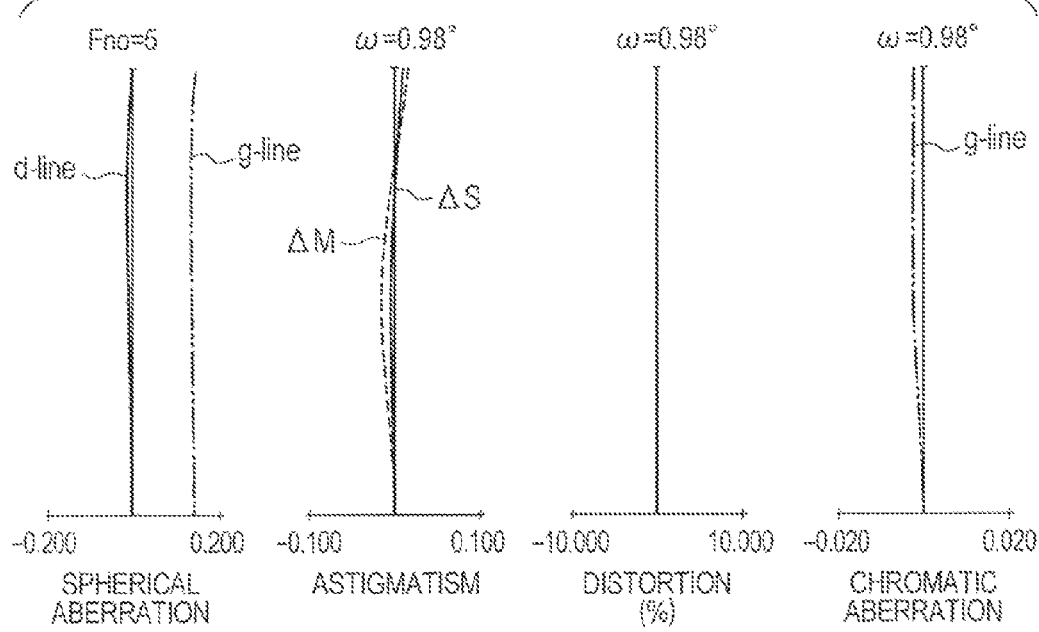
Figure 15:
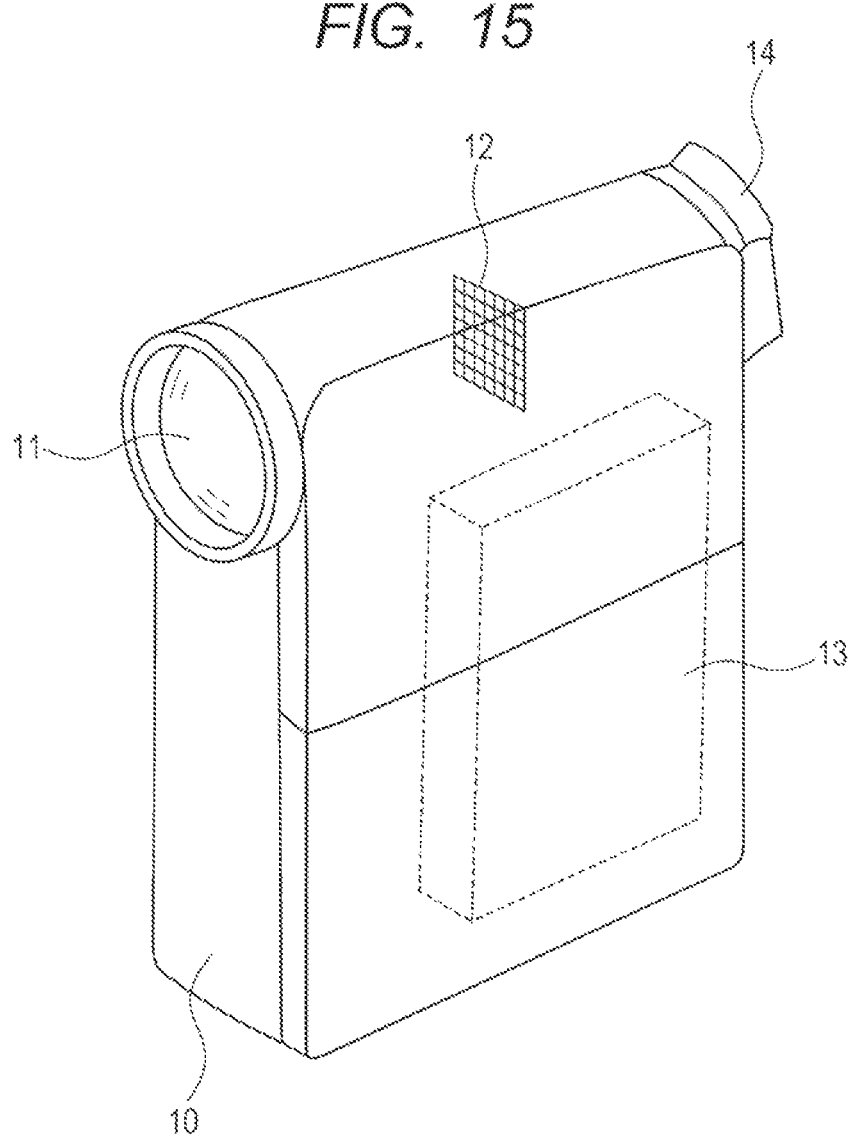
FIG. 15 is a schematic view illustrating the main part of a video camera (image pickup device) having a zoom lens according to an embodiment of the present invention mounted thereon.

FIG. 13 is a cross-sectional view of a zoom lens according to a seventh embodiment of the present invention at a wide angle end. FIGS. 14A, 14B, and 14C are aberration diagrams of the zoom lens of the seventh embodiment at the wide angle end, a middle zooming position, and a telephoto end, respectively FIG. 15 is a schematic view illustrating the main part of a video camera (image pickup device) having a zoom lens of the present invention mounted thereon.

In the embodiments, the zoom lens is provided as a photographic optical system for use in an image pickup device. In the drawings, a subject-to-be-captured side (object side) and an image side, respectively, are to the left and to the right of the cross-sectional views of the lenses. The cross-sectional views of the lenses include a first lens unit L1 having a positive refractive power, a second lens unit L2 having a negative refractive power, a third lens unit L3 having a positive refractive power, and a fourth lens unit L4 having a positive refractive power. An aperture stop SP is located on the object side of the third lens unit L3. Arrows in the drawings represent moving loci of the lenses during a zooming operation from the side angle end to the telephoto end.

In the embodiments, the aperture stop SP of the lens may move or may remain unmoved during a zooming operation. An optical block GB is equivalent to, for example, an optical filter or a face plate. An image plane IP is further provided. When the zoom lens is used as the photographic optical system of a video camera or a digital still camera, the image plane is an image pickup surface of solid-state image sensor such as a CCD sensor or a CMOS sensor. The image plane may also be a film surface when the zoom lens is used as the photographic optical system of a silver-halide film camera.

In the aberration diagrams, spherical aberration is indicated or a d-line and a g-line. In the astigmatism diagrams, ΔM and ΔS represent a meridional image plane and a sagittal image pane, respectively. Transverse chromatic aberration is indicated for a g-line. Fno represents an F-number and ω represents a half viewing angle (degree). In the embodiments described below, the wide angle end and the telephoto end refer to two zooming positions where variable magnification lens units are located at the extreme ends of a mechanically movable range in a direction of the optical axis.

In the embodiments, the second lens unit L2 moves monotonously toward the image side, as indicated by arrows in the drawings, during a zooming operation from the wide angle end to the telephoto end. The third lens unit L3 moves toward the object side monotonously or in a locus projecting toward the object side, to a position on the object side, in order to allow variable magnification at the telephoto end rather than at the wide angle end.

In the zoom lenses of the embodiments, the fourth lens unit L4 moves in a locus projecting toward the object side to correct image plane variations associated with variable magnification. A rear focus method is adopted in the embodiments, in which a focusing operation is carried out by moving the fourth lens unit L4 on the optical axis. A solid line curve 4a and a dotted line curve 4b associated with the fourth lens unit L4 represent moving loci when the lens is in focus at infinity and at a close distance, respectively, to correct image plane variations associated with zooming operations. In the zoom lenses of the embodiments, the fourth lens unit L4 moves in a locus projecting toward the object side, in order to use a space between the third lens unit L3 and the fourth lens unit L4 effectively to shorten the total lens length.

In the embodiments, when focusing from infinity to a close distance at the telephoto end, the fourth lens unit L4 moves forward, as indicated by arrows 4c. Although the first lens unit L1 does not move along the optical axis for the purpose of focusing in the embodiments, it is possible to move the first lens unit L1 as necessary for correcting aberrations. During a photographic operation, by moving an entire part or a part of the third lens unit L3 in a direction having a perpendicular component relative to the optical axis, a photographed image is changed in a perpendicular direction relative to the optical axis to thereby correct image shake that may occur when the zoom lens is shaken. That is, the image shake correction is carried out.

The zoom lens according to an embodiment of the present invention has a feature that the entire zoom lens is compact and has a wide angle of view and a high zoom ratio. To achieve a wide angle of view, a negative-lead-type zoom lens in which a lens unit having a negative refractive power is arranged closest to the object side is advantageous. In many negative-lead-type zoom lenses, however, the F-number increases as the zoom ratio is raised. That is, the F-number increases (F-number drops largely) particularly at the telephoto end, and the lens system is made darker. Because of this, it would be difficult to achieve a high zoom ratio.

In contrast, in the positive-lead-type zoom lens in which a lens unit having a positive refractive power is arranged at the closest position to the object side, the F-number drops only slightly daring a zooming operation. Therefore, the positive-lead-type zoom lens is adopted in the present invention. Specifically, a four-unit zoom lens includes first to fourth lens units arranged in order from the object side to the image side. The first to fourth lens units have a positive refractive power, a negative refractive power, a positive refractive power, and a positive refractive power, respectively. To achieve a high zoom ratio, it is important to decrease the size of the entire zoom lens while restricting the moving amount (stroke) and a change of aberration in zooming of variable magnification lens units.

In the above-described four-unit zoom lens, if the third unit remains unmoved during a zooming operation, a variable magnification load of the third lens unit becomes smaller. To achieve a high zoom ratio, therefore, it is necessary to increase variable magnification loads of the second and fourth lens units. In this case, however, the moving amounts of the second and fourth lens units during a zooming operation are increased, and the size of the entire zoom lens becomes larger.

In the present invention therefore, the variable magnification load of the third lens unit L3 is increased by moving it forward to the object side during a zooming operation from the wide angle end to the telephoto end. During the zooming operation, the moving amounts of the second and fourth lens units are decreased and a change of aberration is reduced while allowing a decrease in the size of the entire zoom lens.

Meanwhile, when it is attempted to widen the angle of view of the lens, an incident angle of light rays entering a front lens (first lens unit) increases, and an entrance pupil position becomes important to decrease the size of the entire zoom lens. In the above-described rear-focus-type four-unit zoom lens. In particular, an effective diameter of the front lens is often determined at a zooming position somewhat closer to the telephoto end from the wide angle end. It is necessary, therefore, to move the entrance pupil position closer to the first lens unit at the zooming position, in order to decrease the effective diameter of the front lens.

In the present invention, the third lens unit L3 has a variable magnification effect by moving it forward to the object side during a zooming operation from the wide angle end to the telephoto end. Thus, a focal length of the third lens unit L3 is longer at a middle zooming position, compared to the case where the third lens unit L3 is unmoved. In addition, by decreasing the variable magnification load of the second lens unit, the moving amount of the second lens unit is limited during a zooming operation. Thus, it is allowed to decrease the effective diameter of the front lens while widening the angle of view at the same focal length by moving the entrance pupil position closer to the first lens unit.

As described above, in the zoom lens according to an embodiment of the present invention, the third lens unit L3 is moved toward the object side during a zooming operation from the wide angle end to telephoto end, such that the third lens unit L3 has a larger variable magnification load, which facilitates achievement of a wide angle of view and a high zoom ratio while decreasing the size of the entire zoom lens. In the embodiments described below, an entirely compact zoom lens with a wide photographing viewing angle of at least 70° and a high zoom ratio of at least 40 is provided.

In the embodiments, it is assumed that M2 represents a moving amount of the second lens unit L2 during a zooming operation from the wide angle end to the telephoto end, f2 represents a focal length of the second lens unit L2, and $\beta 3w$ and $\beta 3t$, respectively represent transverse magnification of the third lens unit L3 at the wide angle end and the telephoto end. In this case, conditional expressions below are satisfied:

$$4.6 < |M2/f2| < 7.5 \qquad (1)$$

$$0.4 < \beta 3t/\beta 3w < 4.5 \qquad (2)$$

where the amount M2 of the second lens unit L2 has a negative sign when located on the object side and has a positive sign when located on the image side, at the telephoto end rather than at the wide angle end.

The conditional expression (1) relates to the refractive power of the second lens unit L2. When the value falls below the lower limit of the conditional expression (1), the moving amount (stroke) of the second lens unit L2 during a zooming operation becomes short, which is advantageous in decreasing the effective diameter of the front lens. In this case, however, it is necessary for the third lens unit L3 to have a variable magnification load. Accordingly, the stroke of the third lens unit L3 becomes longer to increase the entire lens length. In contrast, when the value exceeds the upper limit of the conditional expression (1), the stroke of the second lens unit L2 during a zooming operation becomes long, making it difficult to decrease the entire lens length and the effective diameter of the front lens.

The conditional expression (2) relates to the variable magnification load of the third lens unit L3. When the value falls below the lower limit of the conditional expression (2), the variable magnification load of the third lens unit L3 decreases, making it necessary to increase the variable magnification load of the second lens unit L2. It is necessary, then, to increase the stroke of the second lens unit L2 during a zooming operation, and the effective diameter of the front lens increases. In contrast, when the value exceeds the upper limit of the conditional expression (2), the variable magnification load of the third lens unit L3 increases and the effective diameter of the front lens decreases. However, the stroke of the third lens unit L3 during a zooming operation increases to thereby increase the entire lens length.

To achieve a wide angle of view and a high zoom ratio while decreasing the size of the entire zoom lens, it is necessary to strengthen the refractive power of the second lens unit L2 which functions as a main variable magnification lens unit. In this case, curvature of field, coma aberration of a middle image height, etc. on the wide angle side increase, while a change in transverse chromatic aberration also increases during a zooming operation. In the embodiments, therefore, the third lens unit L3 is moved forward to the object side during a zooming operation from the wide angle end to the telephoto end to share the variable magnification effect to thereby strengthen the refractive power of the second lens unit L2. In this manner, it is allowed to decrease the size of the entire zoom lens while maintaining a coed optical performance by restricting occurrence of various types of aberration such as curvature of field and coma aberration.

More preferably, at least one of the following conditions is satisfied in the embodiments. It is assumed that $\beta 2w$ and $\beta 2t$, respectively, represent transverse magnification of the second lens unit L2 at the wide angle end and the telephoto end, represents a focal length of the third lens unit L3, fw represents a focal length of the entire zoom lens at the wide angle end, and f1 represents a focal of the first lens unit L1. N2nd represents an average refractive index of materials of the lenses constituting the second lens unit L2. In this case, it is preferable that at least one of the following conditional expressions be satisfied.

$$25 < \beta 2t/\beta 2w < 80 \qquad (3)$$

$$6.8 < f3/fw < 11.0 \qquad (4)$$

$$-9.5 < f1/f2 < -6.5 \qquad (5)$$

$$N2 > 1.85 \qquad (6)$$

The conditional expression (3) relates to the variable magnification load of the second lens unit L2, which mainly allows a decrease in the size of the entire lens while favorably correcting aberration in curvature of field, transverse chromatic aberration, etc. When the value exceeds the upper limit of the conditional expression (3), the variable magnification load of the second lens unit L2 increases. Therefore, the moving amount of the second lens unit L2 becomes longer during a zooming operation and the effective diameter of the front lens increases. Since the refractive power of the second lens unit L2 becomes stronger, a change in curvature of field, the transverse chromatic aberration, etc. accompanied by zooming operations also increases, and correcting such aberration becomes difficult.

Meanwhile, when the value fails below the lower limit of the conditional expression (3), the variable magnification load of the second lens unit L2 is decreased. In this case, the correction of curvature of field and transverse chromatic aberration can be carried cut easily on the wide angle side. However, the variable magnification load of the third lens unit L3 increases to reach a predetermined variable magnification ratio. Such a situation is not preferable as the moving amount of the third lens unit L3 increases excessively during a zooming operation and the entire lens length becomes longer.

The conditional expression (4) relates to a distribution of refractive power (power distribution) of the third lens unit L3. The conditional expression (4) mainly works to sufficiently correct axial color aberration, spherical aberration, etc. When the value falls below the lower limit of the conditional expression (4), the refractive power of the third lens unit L3 increases and it is difficult to correct spherical aberration on the wide angle side. It is also difficult to have a sufficiently long back focus. In contrast, when the value exceeds the upper limit of the conditional expression (4), the refractive power of the third lens unit L3 decreases and it is difficult to correct axial chromatic aberration. Such a situation is not preferable, as the moving amount of the third lens unit L3 increases during a zooming operation and the entire lens length becomes longer.

The conditional expression (5) relates to the refractive power of the first and second lens units L1 and L2, respectively. The conditional expression (5) mainly works to improve an optical performance at the telephoto end. When the value falls below the lower limit of the conditional expression (5), the refractive power of the second lens unit L2 increases and the stroke of the lens unit during a zooming operation is shorter. Therefore, it is easy to decrease the size of the entire zoom lens, but a change in curvature of field increases during a zooming operation. In contrast, when the value exceeds the upper limit of the conditional expression (5), the refractive power of the first lens unit L1 increases, making it difficult to correct spherical aberration and axial chromatic aberration at the telephoto end.

The conditional expression (6) relates to a material of the lenses included in the second unit L2 The conditional expression (6) mainly works to sufficiently correct curvature of field. When the value falls below the lower limit of the conditional expression (6), a Petzval sum increases negatively, and a resulting variation in curvature of field increases during a zooming operation. In the embodiments, it is also preferable in correcting aberrations to set the numerical ranges of the conditional expressions (1) to (6) as follows:

$$4.7 < M2/|f2| < 7.3 \quad (1a)$$

$$0.42 < \beta 3t/\beta 3w < 4.30 \quad (2a)$$

$$26 < \beta 2t/\beta 2w < 78 \quad (3a)$$

$$7.0 < f3/fw < 10.8 \quad (4a)$$

$$-9.3 < f1/f2 < -6.6 \quad (5a)$$

$$2.4 > N2nd > 1.85 \quad (6a)$$

More preferably, numerical ranges of the conditional expressions (1a) to (6a) are set as follows:

$$4.8 < M/|f2| < 7.0 \quad (1b)$$

$$0.44 < \beta 3t/\beta 3w < 4.00 \quad (2b)$$

$$28 < \beta 2t/\beta 2w < 75 \quad (3b)$$

$$7.3 < f3/fw < 10.5 \quad (4b)$$

$$-9.1 < f1/f2 < -6.7 \quad (5b)$$

$$2.4 > N2nd > 1.88 \quad (6b)$$

In the embodiments, with the lens structure described above, an entirely compact zoom lens with a wide photographing viewing angle of at least 70° and a high zoom ratio of at least 40 is provided.

Next, the lens structure of the individual lens units will be described. The first lens unit L1 includes, in order from the object side to the image side, a cemented lens, in which a negative lens and a positive lens are cemented together, and one or more positive meniscus-shaped lenses having a convex surface on the object side. In the zoom lenses of the embodiments, the refractive power of the first lens unit L1 is strengthened within an appropriate range so as to provide an entirely compact zoom lens.

When the refractive power of the first lens unit L1 increases, various types of aberrations occur in the first lens unit L1, and spherical aberration, in particular, may occur frequently on the telephoto side. Therefore, the positive refractive power of the first lens unit L1 is shared by the cemented lens and one or two positive lenses to reduce the occurrence of such aberrations. The second lens unit L2 includes four lenses. In order from the object side to the image side, the second lens unit L2 includes a negative lens having a greater absolute value of the refractive power on the image side than that on the object side and having a concave-shaped lens surface on the image side, a biconcave negative lens, a biconvex positive lens, and a biconcave negative lens. The latter two lenses are cemented together.

In the zoom lenses of the embodiments, the refractive power of the second lens unit L2 increases within a range appropriate to obtain a wide angle of view at the wide angle end while decreasing the effective diameter of the first lens unit L1. When the refractive power of the second lens unit L2 increases, various types of aberrations occur in the second lens unit L2, and curvature of field and transverse chromatic aberration, in particular, may occur frequently on the wide angle side. In the embodiments, the negative refractive power of the second lens unit L2 is shared by the two negative lenses to reduce the occurrence of curvature of field. The occurrence of the transverse chromatic aberration is reduced by the cemented lens. With this lens structure, it is possible to obtain a high optical performance while allowing a wider angle lens unit and decreasing an effective diameter of the front lens.

To decrease the refractive power of the lens which is necessary for the achromatic purpose, to the smallest possible value, a high dispersion material having an Abbe number of less than 20 is used for the positive lens constituting the second lens unit L2. In this manner, the occurrence of aberration such as curvature of field and transverse chromatic aberration is restricted while decreasing the size of the entire zoom lens. The third lens unit L3 includes, in order from the object side to the image side, a positive lens having a convex-shaped lens surface on the object side, a negative lens having a concave-shaped lens surface on the image side, and a positive lens having a convex-shaped lens surface on the object side.

In the zoom lens of the embodiments, the refractive power of the third lens unit L3 increases within an appropriate range to decrease the entire lens length at the wide angle end while decreasing the moving amount of the lens unit during a zooming operation. When the refractive power of the third lens unit L3 increases, various types of aberrations occur in the third lens unit L3, and axial chromatic aberration and coma aberration, to particular, may occur frequently because of the third lens unit L3. The third lens unit L3, therefore, is made to share the refractive power by two positive lenses and one negative lens for the achromatic purpose to allow a decrease in the occurrence of coma aberration.

As a material of the negative lens constituting the third lens unit L3, a high refractive index material having a refractive index of more than 1.95 is used to decrease a curvature radius of the lens surface and decrease the occurrence of aberration such as coma aberration and curvature of field. The fourth lens unit L4 includes a cemented lens in which a positive lens and a negative lens are cemented together. In the embodiments, the fourth lens unit L4 is formed by the cemented lens to decrease variations in transverse chromatic aberration or curvature of field during a zooming operation.

In the first, second, fourth, and fifth embodiments, the position of the aperture stop SP of the zoom lens is unmoved during a zooming operation. By making the aperture stop SP remain unmoved, it is easy to provide a simple image pickup device. In the third, sixth, and seventh embodiments, the aperture stop SP of the zoom lens moves toward the object side between the wide angle end and the middle zooming position and also moves toward the image side between the middle zooming position and the telephoto end. By moving the aperture stop SP in this manner, it is possible to use a spree between the second and third lens units L2 and L3 effectively, to thereby reduce the entire lens length and the effective diameter of the front lens.

In the embodiments, during the zooming operation from the wide angle end to the telephoto end, the second lens unit L2 moves toward the image side and the third lens unit L3 moves toward the object side, as indicated by arrows in the drawings. The fourth lens unit L4 moves in a locus projecting toward the object side to correct image plane variations associated with variable magnification. In the zoom lenses of the first, second, and fourth to seventh embodiments, the first lens unit L1 is unmoved during a zooming operation. In the zoom lens of the third embodiment, the first lens unit L1 moves toward the object side in a zooming operation from the wide angle end to the telephoto end.

It is assumed that a1 and b1 represent, respectively, first-order and second-order moving coefficients (moving parameters) of the first lens unit L1. It is also assumed that a3, b3, d3, e3, f3, g3, and h3 represent, respectively, first-order to eighth-order moving coefficients of the third lens unit L3. In this case, the moving amount M1 of the first lens unit L1 and the moving amount M3 of the third lens unit L3 associated with a zooming operation are expressed by the following expressions.

$$M1 = a1x + b1x^2$$

$$M3 = a3x + b3x^2 + c3x^3 + d3x^4 + e3x^5 + f3x^6 + g3x^7 + h3x^8$$

where negative signs of M1 and M3 represent movement toward the object side and positive signs thereof represent movement toward the image side, x is a moving parameter where x=0 represents the wide angle end and x=1 represents the telephoto end.

In the embodiments, when the lens unit structure is as described above, an entirely compact zoom lens having a wide angle of view and a high zoom ratio is provided. When the zoom lens of the embodiments is used in an image pickup device, it is possible to correct distortion aberration through image processing. In this case, it is possible to decrease the effective diameter of the front lens by decreasing the effective diameter of the image circle at the wide angle side compared to that at the telephoto end.

Next, an embodiment of an image pickup device (video camera) using the zoom lens according to an embodiment of the present invention as a photographic optical system will be described below by referring to FIG. 15. In FIG. 15, the video camera includes a camera body 10, a photographic optical system 11, a solid-state image sensor 12, a memory device 13, and an electronic viewfinder 14. The photographic optical system 11 is formed by the zoom lens according to any of the first to seventh embodiments. The solid-state image sensor 12, such as a CCD or a CMOS, is included in the camera body so as to receive an optical subject image formed by the photographic optical system 11. The memory device 13 stores information corresponding to the subject image after photoelectric conversion by the solid-state image sensor 12. The electronic viewfinder 14 is provided to view the subject image after photoelectric conversion by the solid-state image sensor 12.

Next, Numerical Example 1 to 7 corresponding to the first to seventh embodiments of the present invention will be given below. In the numerical examples, i represents the order number of the lens surface counted from the object side, ri represents the curvature radius of the i-th lens surface (i-th surface) from the object side, di represents an interval between the i-th lens surface and the i+1-th lens surface, and ndi and vdi represent, respectively, a refractive index and an Abbe number of the optical material of the i-th lens for the d-line. The moving coefficients (moving parameters) relating to the movement of the first and third lens units are also provided in the numerical examples. Two surfaces positioned closest to the image side are the planes that function as an optical block in Numerical Examples 1 to 7. BF represents a back focus that is an air-converted distance between the final lens surface and the image plane.

An aspheric surface shape is given by X that represents displacement in the direction of the optical axis at a height H from the optical axis with reference to the vertex of the surface. It is assumed that the light traveling direction is positive, R represents a paraxial curvature radius, k represents a conic constant, and A4, A6, and A8 represent aspheric coefficients. In this case, X is given by the following expression:

$$X = \frac{H^2/R}{1 + \sqrt{1-(1+k)(H/R)^2}} + A4H^4 + A6H^6 + A8H^8 \quad \text{Expression 1}$$

where the surface number of the aspheric lens surface is marked with "*" and "e-x" means "$10^{-x}$". The relation between values in the numerical examples and the above-described conditional expressions are shown in Table 1 below.

NUMERICAL EXAMPLE 1

| Surface Data | | | | |
|---|---|---|---|---|
| Surface No. | r | d | nd | vd |
| 1 | 94.524 | 1.50 | 1.84666 | 23.9 |
| 2 | 48.908 | 4.39 | 1.49700 | 81.5 |
| 3 | −357.106 | 0.15 | | |
| 4 | 41.215 | 3.54 | 1.49700 | 81.5 |
| 5 | 257.187 | 0.15 | | |
| 6 | 28.002 | 2.90 | 1.59522 | 67.7 |
| 7 | 57.135 | (variable) | | |
| 8 | 79.932 | 0.60 | 2.00100 | 29.1 |
| 9 | 6.394 | 3.54 | | |
| 10 | −16.816 | 0.50 | 1.83481 | 42.7 |
| 11 | 47.565 | 0.10 | | |
| 12 | 14.678 | 2.85 | 1.95906 | 17.5 |
| 13 | −14.973 | 0.50 | 2.00100 | 29.1 |

-continued

| Surface | r | d | nd | vd |
|---|---|---|---|---|
| 14 | 47.008 | (variable) | | |
| 15(stop) | ∞ | (variable) | | |
| 16* | 13.493 | 3.05 | 1.58313 | 59.4 |
| 17* | −69.098 | 6.00 | | |
| 18 | 76.136 | 0.60 | 2.00100 | 29.1 |
| 19 | 12.453 | 0.30 | | |
| 20 | 17.421 | 2.48 | 1.59522 | 67.7 |
| 21 | −40.852 | (variable) | | |
| 22* | 17.199 | 3.10 | 1.59201 | 67.0 |
| 23 | −16.587 | 0.50 | 1.92286 | 18.9 |
| 24 | −22.296 | (variable) | | |
| 25 | ∞ | 1.85 | 1.51633 | 64.1 |
| 26 | ∞ | 3.91 | | |
| Image Plane | ∞ | | | |

Aspheric Surface Data

Sixteenth Surface

K = 1.35188e+000  A4 = −5.15017e−005  A6 = −1.73679e−006
A8 = 3.45999e−008

Seventeenth Surface

K = 6.71594e+001  A4 = 1.17238e−004  A6 = −1.34987e−006
A8 = 6.01414e−008

Twenty-second Surface

K = −4.85795e+000  A4 = 8.64064e−005  A6 = −5.69670e−007

Various Data
Zoom Ratio 59.29

| | Wide Angle End | Middle | Telephoto End |
|---|---|---|---|
| Focal Length | 3.04 | 44.63 | 180.50 |
| F-number | 1.85 | 5.50 | 6.00 |
| Half Viewing Angle (degrees) | 36.4 | 2.89 | 0.74 |
| Total Lens Length | 100.37 | 100.37 | 100.37 |
| BF | 9.68 | 19.79 | 6.37 |
| d7 | 0.75 | 26.15 | 29.61 |
| d14 | 30.12 | 4.72 | 1.26 |
| d15 | 12.00 | 1.72 | 1.50 |
| d21 | 11.07 | 11.24 | 24.88 |
| d24 | 4.55 | 14.66 | 1.24 |

Zoom Lens Unit Data

| Unit No. | Starting Surface | Focal Length |
|---|---|---|
| 1 | 1 | 41.30 |
| 2 | 8 | −5.38 |
| 3 | 16 | 25.42 |
| 4 | 22 | 18.43 |

Moving Parameter a3 = −49.40525 b3 = 115.46284 c3 = −138.42544
d3 = 72.72449 e3 = −8.85927 f3 = −0.66625
g3 = −0.66625 h3 = −0.66625

NUMERICAL EXAMPLE 2

Surface Data

| Surface No. | r | d | nd | vd |
|---|---|---|---|---|
| 1 | 85.255 | 1.50 | 2.00069 | 25.5 |
| 2 | 45.274 | 4.72 | 1.49700 | 81.5 |
| 3 | −211.332 | 0.15 | | |
| 4 | 40.707 | 2.82 | 1.49700 | 81.5 |
| 5 | 199.920 | 0.15 | | |
| 6 | 25.419 | 2.89 | 1.59522 | 67.7 |
| 7 | 59.842 | (variable) | | |
| 8 | 60.407 | 0.60 | 1.91082 | 35.3 |
| 9 | 5.254 | 3.05 | | |
| 10 | −21.068 | 0.50 | 1.91082 | 35.3 |
| 11 | 20.670 | 0.10 | | |
| 12 | 11.126 | 1.65 | 1.95906 | 17.5 |
| 13 | −65.729 | 0.50 | 1.88300 | 40.8 |
| 14 | 37.254 | (variable) | | |
| 15(stop) | ∞ | (variable) | | |
| 16* | 9.954 | 4.63 | 1.69350 | 53.2 |
| 17* | −49.599 | 0.15 | | |
| 18 | 17.538 | 0.60 | 2.00069 | 25.5 |
| 19 | 9.021 | (variable) | | |
| 20* | 14.395 | 3.39 | 1.59201 | 67.0 |
| 21 | −14.564 | 0.50 | 1.95906 | 17.5 |
| 22 | −21.653 | (variable) | | |
| 23 | ∞ | 1.85 | 1.51633 | 64.1 |
| 24 | ∞ | 3.91 | | |
| Image Plane | ∞ | | | |

Aspheric Surface Data

Sixteenth Surface

K = −6.79225e−001  A4 = −7.55038e−008  A6 = 2.57124e−007
A8 = 3.13755e−009

Seventeenth Surface

K = −1.91606e+001  A4 = 8.21049e−005

Twentieth Surface

K = 2.51180e−002  A4 = −5.07213e−005  A6 = −5.77834e−007

Various Data
Zoom Ratio 44.64

| | Wide Angle End | Middle | Telephoto End |
|---|---|---|---|
| Focal Length | 3.04 | 41.82 | 135.60 |
| F-number | 1.44 | 4.57 | 5.00 |
| Half Viewing Angle (degrees) | 36.5 | 3.10 | 1.00 |
| Total Lens Length | 82.67 | 82.67 | 82.67 |
| BF | 10.52 | 16.55 | 6.15 |
| d7 | 0.62 | 24.37 | 27.61 |
| d14 | 28.24 | 4.50 | 1.26 |
| d15 | 5.32 | 4.75 | 1.50 |
| d19 | 10.07 | 4.61 | 18.26 |
| d22 | 5.39 | 11.42 | 1.02 |

Zoom Lens Unit Data

| Unit No. | Starting Surface | Focal Length |
|---|---|---|
| 1 | 1 | 38.08 |
| 2 | 8 | −5.17 |
| 3 | 16 | 23.67 |
| 4 | 20 | 17.14 |

Moving Parameter a3 = −16.16197 b3 = 5.44101 c3 = 22.58835
d3 = 14.58061 e3 = −10.90692 f3 = −18.76465
g3 = −0.29823 h3 = −0.29823

NUMERICAL EXAMPLE 3

Surface Data

| Surface No. | r | d | nd | vd |
|---|---|---|---|---|
| 1 | 98.884 | 1.50 | 1.84666 | 23.9 |
| 2 | 47.617 | 5.23 | 1.49700 | 81.5 |
| 3 | 1093.952 | 0.15 | | |
| 4 | 47.934 | 4.17 | 1.49700 | 81.5 |
| 5 | 430.541 | 0.15 | | |
| 6 | 42.351 | 2.31 | 1.83481 | 42.7 |
| 7 | 79.392 | (variable) | | |

-continued

| | | | | |
|---|---|---|---|---|
| 8 | 72.341 | 0.60 | 2.00100 | 29.1 |
| 9 | 7.229 | 3.91 | | |
| 10 | −21.513 | 0.50 | 1.88300 | 40.8 |
| 11 | 31.807 | 0.34 | | |
| 12 | 17.136 | 2.00 | 2.10205 | 16.8 |
| 13 | −48.770 | 0.50 | 2.00100 | 29.1 |
| 14 | 58.817 | (variable) | | |
| 15(stop) | ∞ | (variable) | | |
| 16* | 12.491 | 2.91 | 1.58313 | 59.4 |
| 17* | 4585.482 | 5.47 | | |
| 18 | 39.759 | 0.60 | 2.00100 | 29.1 |
| 19 | 12.083 | 0.35 | | |
| 20 | 17.757 | 2.70 | 1.59522 | 67.7 |
| 21 | −61.519 | (variable) | | |
| 22* | 16.120 | 3.12 | 1.59201 | 67.0 |
| 23 | −19.039 | 0.50 | 1.92286 | 18.9 |
| 24 | −28.276 | (variable) | | |
| 25 | ∞ | 1.85 | 1.51633 | 64.1 |
| 26 | ∞ | 3.91 | | |
| Image Plane | ∞ | | | |

Aspheric Surface Data

Sixteenth Surface

K = −6.99625e−001   A4 = 3.89767e−006   A6 = 3.50418e−007
A8 = −9.73835e−009

Seventeenth Surface

K = −7.45750e+006   A4 = 2.74544e−005   A6 = 3.27957e−009
A8 = −7.76768e−009

Twenty-second Surface

K = −8.54658e−001   A4 = −2.48572e−066   A6 = 6.34107e−008

Various Data
Zoom Ratio 49.80

| | Wide Angle End | Middle | Telephoto End |
|---|---|---|---|
| Focal Length | 2.57 | 45.55 | 128.00 |
| F-number | 1.85 | 4.62 | 5.00 |
| Half Viewing Angle (degrees) | 38.2 | 2.83 | 1.02 |
| Total Lens Length | 106.53 | 107.02 | 107.15 |
| BF | 10.21 | 19.45 | 11.65 |
| d7 | 0.60 | 34.56 | 39.25 |
| d14 | 38.40 | 2.53 | 1.26 |
| d15 | 14.63 | 5.28 | 1.50 |
| d21 | 5.66 | 8.18 | 16.46 |
| d24 | 5.09 | 14.32 | 6.52 |

Zoom Lens Unit Data

| Unit No. | Starting Surface | Focal Length |
|---|---|---|
| 1 | 1 | 52.25 |
| 2 | 8 | −6.66 |
| 3 | 16 | 26.95 |
| 4 | 22 | 19.72 |

Moving Parameter a1 = −0.13158  b1 = −0.48147
a3 = −46.40507  b3 = 86.55814  c3 = −60.84279
d3 = −122.15130  e3 = 239.95710  f3 = −94.54944
g3 = −12.88179  h3 = −1.91488

NUMERICAL EXAMPLE 4

Surface Data

| Surface No. | r | d | nd | vd |
|---|---|---|---|---|
| 1 | 94.821 | 1.50 | 1.84666 | 23.9 |
| 2 | 49.889 | 4.75 | 1.49700 | 81.5 |
| 3 | −368.278 | 0.15 | | |
| 4 | 42.147 | 3.92 | 1.49700 | 81.5 |
| 5 | 298.499 | 0.15 | | |
| 6 | 27.321 | 3.24 | 1.59282 | 68.6 |
| 7 | 52.988 | (variable) | | |
| 8 | 75.612 | 0.60 | 2.00100 | 29.1 |
| 9 | 6.608 | 3.18 | | |
| 10 | −17.640 | 0.50 | 1.90826 | 38.7 |
| 11 | 77.849 | 0.10 | | |
| 12 | 14.745 | 3.89 | 1.95906 | 17.5 |
| 13 | −8.334 | 0.50 | 2.01819 | 25.0 |
| 14 | 32.494 | (variable) | | |
| 15(stop) | ∞ | (variable) | | |
| 16* | 13.428 | 3.61 | 1.58313 | 59.4 |
| 17* | −44.842 | 5.90 | | |
| 18 | 284.356 | 0.60 | 2.00100 | 29.1 |
| 19 | 10.068 | 0.02 | | |
| 20 | 10.228 | 2.83 | 1.48067 | 43.9 |
| 21 | −49.252 | (variable) | | |
| 22* | 18.591 | 3.16 | 1.59201 | 67.0 |
| 23 | −14.943 | 0.50 | 1.84666 | 23.9 |
| 24 | −20.669 | (variable) | | |
| 25 | ∞ | 1.85 | 1.51633 | 64.1 |
| 26 | ∞ | 3.90 | | |
| Image Plane | ∞ | | | |

Aspheric Surface Data

Sixteenth Surface

K = −3.69536e−002   A4 = −2.65283e−005   A6 = −4.94023e−008
A8 = 4.71186e−009

Seventeenth Surface

K = 2.25732e+001   A4 = 7.04530e−005   A6 = 1.64565e−007
A8 = 7.8111e−009

Twenty-second Surface

K = 6.29556e−002   A4 = −4.38688e−005   A6 = −1.13944e−007

Various Data
Zoom Ratio 98.52

| | Wide Angle End | Middle | Telephoto End |
|---|---|---|---|
| Focal Length | 3.07 | 53.41 | 302.40 |
| F-number | 1.85 | 8.14 | 9.00 |
| Half Viewing Angle (degrees) | 36.2 | 2.40 | 0.50 |
| Total Lens Length | 110.05 | 110.05 | 110.05 |
| BF | 12.67 | 27.40 | 5.19 |
| d7 | 0.69 | 26.22 | 29.71 |
| d14 | 30.27 | 4.74 | 1.26 |
| d15 | 15.80 | 1.73 | 1.49 |
| d21 | 11.50 | 10.85 | 33.29 |
| d24 | 7.55 | 22.27 | 0.07 |

Zoom Lens Unit Data

| Unit No. | Starting Surface | Focal Length |
|---|---|---|
| 1 | 1 | 41.57 |
| 2 | 8 | −5.01 |
| 3 | 16 | 30.47 |
| 4 | 22 | 18.49 |

Moving Parameter a3 = −54.92810  b3 = 115.77754  c3 = −132.55364
d3 = 73.04905  e3 = −15.03488  a3 = −9.56323
g3 = 3.78741  h3 = 4.15824

NUMERICAL EXAMPLE 5

Surface Data

| Surface No. | r | d | nd | vd |
|---|---|---|---|---|
| 1 | 58.468 | 1.20 | 1.90366 | 31.3 |
| 2 | 30.466 | 5.61 | 1.49700 | 81.6 |
| 3 | −116.688 | 0.18 | | |
| 4 | 25.809 | 3.16 | 1.60311 | 60.6 |
| 5 | 86.046 | (variable) | | |
| 6 | 294.306 | 0.60 | 2.00100 | 29.1 |
| 7 | 7.111 | 2.97 | | |
| 8 | −16.769 | 0.50 | 1.80400 | 46.6 |
| 9 | 50.788 | 0.20 | | |
| 10 | 16.345 | 2.09 | 1.95906 | 17.5 |
| 11 | −30.678 | 0.50 | 1.91082 | 35.3 |
| 12 | 84.161 | (variable) | | |
| 13(stop) | ∞ | (variable) | | |
| 14* | 11.176 | 3.29 | 1.59201 | 67.0 |
| 15* | −74.189 | 5.08 | | |
| 16 | 84.456 | 0.60 | 2.00100 | 29.1 |
| 17 | 11.772 | 0.83 | | |
| 18 | 34.923 | 1.91 | 1.56384 | 60.7 |
| 19 | −24.522 | (variable) | | |
| 20* | 14.233 | 3.00 | 1.59201 | 67.0 |
| 21 | −20.763 | 0.50 | 1.84666 | 23.9 |
| 22 | −36.873 | (variable) | | |
| 23 | ∞ | 1.85 | 1.51633 | 64.1 |
| 24 | ∞ | 3.91 | | |
| Image Plane | ∞ | | | |

Aspheric Surface Data

Fourteenth Surface $K = -6.95166e-001$  $A4 = 2.06563e-005$  $A6 = -8.34262e-007$
$A8 = 1.48032e-008$ Fifteenth Surface $K = -2.66721e+002$  $A4 = -1.59735e-005$  $A6 = 3.40464e-008$
$A8 = 7.65555e-009$ Twentieth Surface $K = -3.55331e+000$  $A4 = -1.40433e-004$  $A6 = -6.21548e-007$

Various Data
Zoom Ratio 49.60

| | Wide Angle End | Middle | Telephoto End |
|---|---|---|---|
| Focal Length | 3.04 | 51.30 | 150.80 |
| F-number | 1.85 | 5.50 | 6.00 |
| Half Viewing Angle (degrees) | 36.5 | 2.50 | 0.90 |
| Total Lens Length | 94.27 | 94.27 | 94.27 |
| BF | 9.93 | 19.60 | 6.56 |
| d5 | 0.74 | 28.63 | 32.44 |
| d12 | 32.96 | 5.06 | 1.26 |
| d13 | 12.75 | 1.50 | 1.50 |
| d19 | 5.68 | 7.25 | 20.28 |
| d22 | 4.80 | 14.47 | 1.43 |

Zoom Lens Unit Data

| Unit No. | Starting Surface | Focal Length |
|---|---|---|
| 1 | 1 | 43.73 |
| 2 | 6 | −6.45 |
| 3 | 14 | 25.20 |
| 4 | 20 | 19.51 |

Moving Parameter a3 = −48.47560 b3 = 104.71731 c3 = −138.06876
d3 = −77.73838 e3 = 6.28302 f3 = −6.21165
g3 = −0.84651 h3 = −6.38279

NUMERICAL EXAMPLE 6

Surface Data

| Surface No. | r | d | nd | vd |
|---|---|---|---|---|
| 1 | 75.648 | 1.50 | 1.84666 | 23.9 |
| 2 | 47.788 | 5.05 | 1.49700 | 81.5 |
| 3 | 381.334 | 0.15 | | |
| 4 | 54.854 | 3.75 | 1.49700 | 81.5 |
| 5 | 346.470 | 0.15 | | |
| 6 | 37.264 | 3.10 | 1.59522 | 67.7 |
| 7 | 78.936 | (variable) | | |
| 8 | 48.965 | 0.60 | 2.00100 | 29.1 |
| 9 | 6.866 | 4.18 | | |
| 10 | −17.927 | 0.50 | 1.85560 | 42.8 |
| 11 | 41.143 | 0.28 | | |
| 12 | 17.198 | 2.10 | 2.10205 | 16.8 |
| 13 | −37.337 | 0.50 | 2.00100 | 29.1 |
| 14 | 40.238 | (variable) | | |
| 15(stop) | ∞ | (variable) | | |
| 16* | 12.940 | 2.97 | 1.58313 | 59.4 |
| 17* | −508.515 | 5.08 | | |
| 18 | 37.614 | 0.60 | 2.00100 | 29.1 |
| 19 | 12.225 | 0.41 | | |
| 20 | 20.097 | 2.38 | 1.59522 | 67.7 |
| 21 | −38.044 | (variable) | | |
| 22* | 17.155 | 2.79 | 1.59201 | 67.0 |
| 23 | −17.047 | 0.50 | 1.92286 | 18.9 |
| 24 | −25.255 | (variable) | | |
| 25 | ∞ | 1.85 | 1.51633 | 64.1 |
| 26 | ∞ | 3.91 | | |
| Image Plane | ∞ | | | |

Aspheric Surface Data

Sixteenth Surface $K = 3.30618e-001$  $A4 = -3.67355e-005$  $A6 = -4.67114e-007$
$A8 = 1.38530e-009$ Seventeenth Surface $K = -3.38528e+003$  $A4 = 4.24040e-005$  $A6 = -5.15400e-007$
$A8 = 3.27807e-009$ Twenty-second Surface $K = 1.61917e+000$  $A4 = -5.38223e-005$  $A6 = -3.66735e-007$

Various Data
Zoom Ratio 49.42

| | Wide Angle End | Middle | Telephoto End |
|---|---|---|---|
| Focal Length | 2.63 | 44.43 | 130.00 |
| F-number | 1.85 | 4.62 | 5.00 |
| Half Viewing Angle (degrees) | 40.5 | 2.90 | 1.00 |
| Total Lens Length | 108.14 | 108.14 | 108.14 |
| BF | 9.16 | 19.62 | 12.62 |
| d7 | 0.55 | 35.20 | 39.93 |
| d14 | 38.24 | 2.77 | 1.26 |
| d15 | 13.12 | 4.81 | 1.50 |
| d21 | 10.46 | 9.15 | 16.24 |
| d24 | 4.03 | 14.49 | 7.49 |

Zoom Lens Unit Data

| Unit No. | Starting Surface | Focal Length |
|---|---|---|
| 1 | 1 | 54.01 |
| 2 | 8 | −6.08 |
| 3 | 16 | 25.56 |
| 4 | 22 | 19.82 |

Moving Parameter a3 = −44.82932 b3 = 105.13897 c3 = −126.96392
d3 = 64.35475 e3 = −1.97798 f3 = −2.86549
g3 = −1.26339 h3 = −0.82994

NUMERICAL EXAMPLE 7

Surface Data

| Surface No. | r | d | nd | vd |
|---|---|---|---|---|
| 1 | 105.193 | 1.50 | 1.84666 | 23.9 |
| 2 | 47.145 | 5.01 | 1.49700 | 81.5 |
| 3 | 466.519 | 0.15 | | |
| 4 | 55.476 | 3.76 | 1.49700 | 81.5 |
| 5 | 459.470 | 0.15 | | |
| 6 | 41.653 | 3.07 | 1.83481 | 42.7 |
| 7 | 96.217 | (variable) | | |
| 8 | 84.395 | 0.60 | 2.00100 | 29.1 |
| 9 | 7.023 | 4.45 | | |
| 10 | −21.404 | 0.50 | 1.88300 | 40.8 |
| 11 | 33.648 | 0.10 | | |
| 12 | 15.831 | 2.20 | 2.10205 | 16.8 |
| 13 | −37.876 | 0.50 | 2.00100 | 29.1 |
| 14 | 35.177 | (variable) | | |
| 15(stop) | ∞ | (variable) | | |
| 16* | 11.403 | 3.27 | 1.58313 | 59.4 |
| 17* | −226.293 | 3.74 | | |
| 18 | 36.772 | 0.60 | 2.00100 | 29.1 |

-continued

| | | | | |
|---|---|---|---|---|
| 19 | 10.850 | 0.31 | | |
| 20 | 14.438 | 2.60 | 1.51823 | 58.9 |
| 21 | −53.321 | (variable) | | |
| 22* | 16.791 | 2.69 | 1.59201 | 67.0 |
| 23 | −18.601 | 0.50 | 1.92286 | 18.9 |
| 24 | −28.368 | (variable) | | |
| 25 | ∞ | 1.85 | 1.51633 | 64.1 |
| 26 | ∞ | 3.91 | | |
| Image Plane | ∞ | | | |

Aspheric Surface Data

Sixteenth Surface

K = −2.42653e−001  A4 = 6.79112e−006  A6 = −7.29594e−007
A8 = 4.29583e−008

Seventeenth Surface

K = 1.25526e+003  A4 = 8.88002e−005  A6 = −8.15432e−007
A8 = 6.31836e−008

Twenty-second Surface

K = 1.87751e+000  A4 = −7.18742e−005  A6 = −4.58043e−007

Various Data
Zoom Ratio 55.76

| | Wide Angle End | Middle | Telephoto End |
|---|---|---|---|
| Focal Length | 2.39 | 46.91 | 133.15 |
| F-number | 1.85 | 4.62 | 5.00 |
| Half Viewing Angle (degrees) | 43.3 | 2.74 | 0.98 |
| Total Lens Length | 108.96 | 108.96 | 108.96 |
| BF | 9.02 | 21.36 | 13.85 |
| d7 | 0.65 | 35.77 | 40.55 |
| d14 | 39.13 | 5.00 | 1.26 |
| d15 | 15.00 | 2.70 | 1.50 |
| d21 | 9.45 | 8.44 | 16.09 |
| d24 | 3.89 | 16.23 | 8.72 |

Zoom Lens Unit Data

| Unit No. | Starting Surface | Focal Length |
|---|---|---|
| 1 | 1 | 53.03 |
| 2 | 8 | −5.89 |
| 3 | 16 | 24.84 |
| 4 | 22 | 20.42 |

Moving Parameter a3 = −48.65443  b3 = 90.29858  c3 = −54.31032
d3 = −130.69916  e3 = 236.91640  f3 = −92.96865
g3 = −11.38933  h3 = −0.66399

TABLE 1

| Conditional Expressions | | Numerical Example 1 | Numerical Example 2 | Numerical Example 3 | Numerical Example 4 | Numerical Example 5 | Numerical Example 6 | Numerical Example 7 |
|---|---|---|---|---|---|---|---|---|
| (1) | $M2/|f2|$ | 5.36 | 5.21 | 5.71 | 5.79 | 4.91 | 6.47 | 6.77 |
| (2) | $\beta 3t/\beta 3w$ | 0.99 | 0.45 | 2.09 | 0.54 | 1.01 | 2.71 | 3.81 |
| (3) | $\beta 2t/\beta 2w$ | 41.43 | 53.45 | 29.05 | 69.26 | 34.44 | 28.84 | 28.10 |
| (4) | $f3/fw$ | 8.35 | 7.79 | 10.48 | 9.93 | 8.29 | 9.72 | 10.40 |
| (5) | $f1/f2$ | −7.67 | −7.36 | −7.85 | −8.30 | −6.78 | −8.88 | −9.00 |
| (6) | N2nd | 1.95 | 1.90 | 1.96 | 1.98 | 1.91 | 1.95 | 1.96 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-050184, filed Mar. 13, 2013, which is hereby incorporated by reference herein in its entirety.

What is claimed is:

1. A zoom lens comprising, in order from an object side to an image side:
   a first lens unit having a positive refractive power;
   a second lens unit having a negative refractive power;
   a third lens unit having a positive refractive power; and
   a fourth lens unit having a positive refractive power,
   wherein the second lens unit, the third lens unit, and the fourth lens unit move during a zooming operation to change an interval between adjacent lens units, and
   wherein the following conditional expressions are satisfied:

$$4.6 < M2/|f2| < 7.5$$

$$0.4 < \beta 3t/\beta 3w < 4.5$$

where M2 represents a moving amount of the second lens unit during a zooming operation from a wide angle end to a telephoto end, f2 represents a focal length of the second lens unit, and $\beta 3w$ and $\beta 3t$ represent transverse magnification of the third lens unit at the wide angle end and the telephoto end, respectively.

2. The zoom lens according to claim 1, wherein the following conditional expression is satisfied:

$$25 < \beta 2t/\beta 2w < 80$$

where β2w represents transverse magnification of the second lens unit at the wide angle end and β2t represents transverse magnification of the second lens unit at the telephoto end.

3. The zoom lens according to claim 1, wherein the following conditional expression is satisfied:

$$6.8 \leq f3/fw < 11.0$$

where f3 represents a focal length of the third lens unit and fw represents a focal length of the zoom lens at the wide angle end.

4. The zoom lens according to claim 1, wherein the following conditional expression is satisfied:

$$-9.5 < f1/f2 < -6.5$$

where f1 represents a focal length of the first lens unit.

5. The zoom lens according to claim 1, wherein the following conditional expression is satisfied:

$$N2nd > 1.85$$

where N2nd represents an average refractive index of a material of a lens included in the second lens unit.

6. The zoom lens according to claim 1, wherein an entire part or a part of the third lens unit moves during image shake correction in a direction having a perpendicular component relative to an optical axis.

7. The zoom lens according to claim 1, wherein the first lens unit moves during a zooming operation.

8. The zoom lens according to claim 1, wherein an effective image circle diameter is smaller at the wide angle end than at the telephoto end.

9. An image pickup device comprising:
a zoom lens; and
an image pickup element configured to receive an optical image formed by the zoom lens,
the zoom lens comprising, in order from an object side to an image side:
a first lens unit having a positive refractive power;
a second lens unit having a negative refractive power;
a third lens unit having a positive refractive power; and
a fourth lens unit having a positive refractive power,
wherein the second lens unit, the third lens unit, and the fourth lens unit move during a zooming operation to change an interval between adjacent lens units, and
wherein the following conditional expressions are satisfied:

$$4.6 < M2/|f2| < 7.5$$

$$0.4 < \beta 3t/\beta 3w < 4.5$$

where M2 represents a moving amount of the second lens unit during a zooming operation from a wide angle end to a telephoto end, f2 represents a focal length of the second lens unit, and β3w and β3t represent transverse magnification of the third lens unit at the wide angle end and the telephoto end, respectively.

* * * * *